(12) United States Patent
Shimodaira et al.

(10) Patent No.: US 11,367,225 B2
(45) Date of Patent: Jun. 21, 2022

(54) IMAGE INSPECTION APPARATUS

(71) Applicant: Keyence Corporation, Osaka (JP)

(72) Inventors: Masato Shimodaira, Osaka (JP); Norimasa Mayumi, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 251 days.

(21) Appl. No.: 16/839,180

(22) Filed: Apr. 3, 2020

(65) Prior Publication Data
US 2020/0364905 A1 Nov. 19, 2020

(30) Foreign Application Priority Data

May 16, 2019 (JP) .............................. JP2019-093173

(51) Int. Cl.
G06T 9/00 (2006.01)
G06T 7/00 (2017.01)
(Continued)

(52) U.S. Cl.
CPC .............. G06T 9/002 (2013.01); G01N 21/88 (2013.01); G06N 3/02 (2013.01); G06T 7/00 (2013.01)

(58) Field of Classification Search
CPC . G06T 9/002; G06T 7/00; G06T 2207/20081; G06T 2207/20084; G06T 2207/20021; G06T 2207/20016; G06T 7/0004; G06T 2207/30242; G01N 21/88; G01N 2021/8883; G01N 2021/8887; G01N 2021/8854; G01N 21/8851; G06N 3/02;
(Continued)

(56) References Cited

U.S. PATENT DOCUMENTS

| 2005/0286755 A1* | 12/2005 | Maali ..................... G06T 7/32 382/151 |
| 2018/0349742 A1* | 12/2018 | Alekseevich ........ G06N 3/0454 |
| 2020/0402221 A1* | 12/2020 | Ijiri ....................... G06N 5/046 |

FOREIGN PATENT DOCUMENTS

| JP | 2013120550 A | 6/2013 |
| JP | 20185640 A | 1/2018 |

OTHER PUBLICATIONS

U.S. Appl. No. 16/839,189, filed Apr. 3, 2020 (75 pages).

* cited by examiner

Primary Examiner — Jianxun Yang
(74) Attorney, Agent, or Firm — Kilyk & Bowersox, P.L.L.C.

(57) ABSTRACT

When a normal inspection and an inspection through deep learning processing is applicable, high inspection accuracy is obtained while reducing a processing time. The normal inspection processing is applied to a newly acquired inspection target image, the non-defective product determination or the defective product determination is confirmed for the inspection target image having the characteristic amount with which the non-defective product determination or the defective product determination is executable based on the characteristic amount within the inspection target image and the threshold for confirming the non-defective product determination or the threshold for confirming the defective product determination. The deep learning processing is applied to the inspection target image having the characteristic amount with which the non-defective product determination or the defective product determination is not confirmable, and the non-defective product determination or the defective product determination is executed.

4 Claims, 22 Drawing Sheets

(51) Int. Cl.
*G06N 3/02* (2006.01)
*G01N 21/88* (2006.01)

(58) Field of Classification Search
CPC ...... G06N 3/04; G06K 9/6271; G06K 9/3233; G06K 2209/19; G06K 9/00771
See application file for complete search history.

IMAGE INSPECTION APPARATUS

CROSS-REFERENCE TO RELATED APPLICATIONS

The present application claims foreign priority based on Japanese Patent Application No. 2019-093173, filed May 16, 2019, the contents of which are incorporated herein by reference.

BACKGROUND OF THE INVENTION

1. Field of the Invention

The present invention relates to an image inspection apparatus that performs a quality determination of an inspection target based on an image obtained by capturing the inspection target.

2. Description of Related Art

For example, as disclosed in JP 2013-120550 A, in general inspection processing using an image obtained by capturing an inspection target, a quality determination of the inspection target is performed based on various characteristic amounts (color, edge, or position) of the inspection target within the image (hereinafter, referred to as a normal inspection). In the normal inspection, the quality determination of the inspection target is performed by selecting a characteristic amount to be used for an inspection by a user at the time of setting the image inspection apparatus, setting a threshold as a criterion of the quality determination for the selected characteristic amount, extracting the selected characteristic amount at the time of setting from a newly input inspection image at the time of running, and comparing the extracted characteristic amount with the threshold. It is easy to perform the quality determination for an image with a clear characteristic amount such as a color and an edge. However, for example, the characteristic amount is easily changed by an imaging condition on an inspection target with many color unevenness or an inspection target such as a metal component of which an appearance of an edge is easily changed by a surrounding environment. Even though the quality determination is easily performed by an inspection with the eyes of a person, it may be difficult to perform the determination in the image inspection apparatus, and a determination result may not be stable.

As an inspection processing technology capable of coping with such a difficult inspection, a technology for causing a known machine learning device such as a neural network to learn characteristics of a non-defective product image obtained by capturing a non-defective product and a defective product image obtained by capturing a defective product and discriminating whether a newly input inspection target image is the non-defective product or the defective product by the machine learning device has been known (for example, see JP 2018-5640 A).

Incidentally, learning with a neural network having multiple layers and a greatly improved discrimination ability is generally called deep learning. In the deep learning, the learning is completed by inputting images to which a plurality of non-defective product attributes is given in advance and images to which defective product attributes are given to the multi-layer neural network and adjusting a plurality of parameters within the network such that the non-defective product images and the defective product images are discriminable. This deep learning is used in many fields.

However, the deep learning processing has a problem that a behavior when unknown data which is not used for learning is input is unstable. That is, when the deep learning processing is applied to the inspection processing of the inspection target and two-class determination of whether the inspection target is the non-defective product or the defective product is learned, for example, in a case where data which is in an unexpected defective state and is not present in learning data is input, the defective product may be erroneously determined to be the non-defective product. Accordingly, it is necessary to prevent such an erroneous determination in advance in an inspection process at a factory. The deep learning processing requires a longer processing time for the determination than that of the normal inspection, and thus, the longer processing time is also a problem to be improved in the inspection process at the factory.

As described above, although the deep learning processing has an advantage that the inspection of the inspection target that is difficult to be handled in the normal inspection is executable, there is a problem that the behavior for unknown data is unstable or the processing time becomes long. Meanwhile, when the characteristic amount is clear, a sufficiently stable inspection is executable even in the normal inspection, and there is almost no advantage of using the deep learning processing in such a case.

SUMMARY OF THE INVENTION

The present invention has been made in view of such circumstances, and an object of the present invention is to obtain high inspection accuracy while reducing a processing time when a normal inspection and an inspection through deep learning processing is applicable.

In order to achieve the object, according to one embodiment of the invention, there is provided an image inspection apparatus that performs a quality determination of an inspection target based on an inspection target image acquired by capturing the inspection target. The apparatus includes a normal inspection setting section that performs a setting of normal inspection processing by receiving a setting of a characteristic amount used for an inspection and a setting of a threshold for confirming a non-defective product determination or a threshold for confirming a defective product determination from a user, the threshold being compared with the characteristic amount, a deep learning setting section that causes a neural network to learn by inputting a plurality of non-defective product images to which non-defective product attributes are given and/or a plurality of defective product images to which defective product attributes are given to an input layer of the neural network, and performs a setting of deep learning processing for classifying a newly input inspection target image into the non-defective product image and the defective product image, and an inspection execution section that applies the normal inspection processing to a newly acquired inspection target image, confirms the non-defective product determination or the defective product determination for the inspection target image having the characteristic amount with which the non-defective product determination or the defective product determination is executable based on the characteristic amount within the inspection target image and the threshold for confirming the non-defective product determination or the threshold for confirming the defective product determination, applies the deep learning processing to the inspection target image having the characteristic amount with which the non-defective product determination or the defective product determination is not confirmable, and executes the non-defective product determination or the defective product determination.

According to this configuration, the setting of the characteristic amount used for the inspection and the setting of the threshold for confirming the non-defective product determination or the threshold for confirming the defective product determination are executable by the normal inspection setting section, and the classification of the non-defective product image and the defective product image is performed by the deep learning setting section by causing the neural network to learn the non-defective product images and the defective product images. That is, the normal inspection processing and the deep learning processing are executable. Only the non-defective product images or only the defective product images may be input as learning images to the input layer of the neural network. The number of layers of the neural network is set to three or more, a discrimination ability is greatly improved by the so-called deep learning.

When the normal inspection processing is applied to the newly acquired inspection target image, the non-defective product determination is confirmed for the inspection target image having the characteristic amount with which the non-defective product determination is executable based on the characteristic amount within the inspection target image and the threshold for confirming the non-defective product determination. Further, the defective product determination is confirmed for the inspection target image having the characteristic amount with which the defective product determination is executable based on the characteristic amount within the inspection target image and the threshold for confirming the defective product determination. Therefore, a throughput is greatly improved by inspecting the inspection target that can be obviously determined to be the non-defective product or the inspection target that can be obviously determined to be the defective product by the normal inspection processing with a high processing speed. Since only a few remaining inspection targets are inspected by the deep learning processing, it is possible to increase the inspection accuracy while suppressing a reduction in processing speed.

According to another embodiment of the invention, the inspection execution section is configured to confirm the non-defective product determination for the inspection target image having the characteristic amount with which the non-defective product determination is executable and confirm the defective product determination for the inspection target image having the characteristic amount with which the defective product determination is executable, by the normal inspection processing, and apply the deep learning processing to only the inspection target image having the characteristic amount with which the non-defective product determination is not confirmable and the inspection target image having the characteristic amount with which the defective product determination is not confirmable.

According to this configuration, it is possible to inspect both the inspection target object that can be obviously determined to be the non-defective product and the inspection target object that can be obviously determined to be the defective product by the normal inspection processing with a high processing speed.

According to still another embodiment of the invention, the inspection execution section is configured to perform the quality determination by using a normalized correlation by the normal inspection processing, and confirm the defective product determination by the normal inspection processing when a correlation value obtained by the normal inspection processing is equal to or smaller than the threshold for confirming the defective product determination.

According to this configuration, when the quality determination is performed by using the normalized correlation such as a pattern search by the normal inspection processing, the correlation value can be obtained. When the correlation value obtained by the normal inspection processing is equal to or smaller than the threshold for confirming the defective product determination, there is a high possibility that the product is the defective product. In this case, the erroneous determination can be extremely reduced by confirming the defective product determination.

According to still another embodiment of the invention, the inspection execution section is configured to perform the quality determination by using a normalized correlation by the normal inspection processing, and confirm the non-defective product determination by the normal inspection processing when a correlation value obtained by the normal inspection processing is equal to or larger than the threshold for confirming the non-defective product determination.

According to this configuration, when the correlation value obtained by the normal inspection processing is equal to or larger than the threshold for confirming the non-defective product determination, there is a high possibility that the product is the non-defective product. In this case, the erroneous determination can be extremely reduced by confirming the non-defective product determination.

According to still another embodiment of the invention, the inspection execution section is configured to perform the quality determination by a difference inspection for detecting a blob of a difference between a registration image registered in advance and the newly acquired inspection target image, and confirm the defective product determination by the normal inspection processing when a blob area of the difference obtained by the normal inspection processing is equal to or larger than the threshold for confirming the defective product determination.

According to this configuration, since the defective product determination is confirmable based on the blob area of the difference, it is not necessary to use the deep learning processing in this case. Accordingly, the unstable behavior peculiar to the deep learning processing can be eliminated.

According to still another embodiment of the invention, the inspection execution section is configured to perform the quality determination by a difference inspection for detecting a blob of a difference between a registration image registered in advance and the newly acquired inspection target image, and confirm the non-defective product determination by the normal inspection processing when a blob area of the difference obtained by the normal inspection processing is equal to or smaller than the threshold for confirming the non-defective product determination.

According to this configuration, when the quality determination is performed by using the blob detection by the normal inspection processing, the blob area of the difference can be obtained. When the blob area of the difference is equal to or smaller than the threshold for confirming the non-defective product determination, there is a high possibility that the product is obviously the non-defective product. In such a case, the erroneous determination can be extremely reduced by confirming the non-defective product determination.

According to the present invention, since the non-defective product determination or the defective product determination is confirmed for the inspection target image having the characteristic amount with which the non-defective product determination or the defective product determination is executable based on the characteristic amount within the inspection target image and the threshold for confirming the non-defective product determination or the threshold for confirming the defective product determination and the deep learning processing is applicable to the inspection target image having the characteristic amount with which the non-defective product determination or the defective product determination is not confirmable, it is possible to obtain the high inspection accuracy while reducing the producing time.

DETAILED DESCRIPTION OF PREFERRED EMBODIMENTS

Hereinafter, an embodiment of the present invention will be described in detail with reference to the drawings. It should be noted that the following description of preferred embodiments is merely an example in nature, and is not intended to limit the present invention, the application thereof, or the purpose of use thereof.

Figure 1:
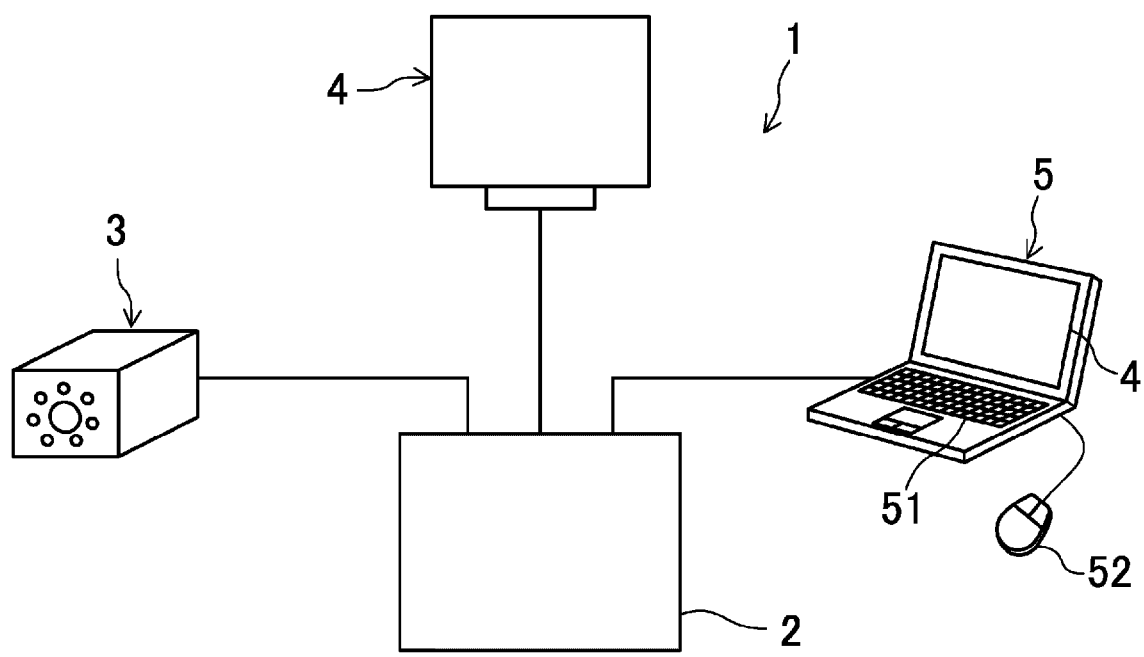
FIG. 1 is a schematic diagram illustrating a configuration of an image inspection apparatus according to an embodiment of the present invention.

FIG. 1 is a schematic diagram illustrating a configuration of an image inspection apparatus 1 according to an embodiment of the present invention. The image inspection apparatus 1 is an apparatus that performs a quality determination of an inspection target based on an inspection target image acquired by capturing the inspection target such as various components or products, and can be used at a production site such as a factory. The entire inspection target may be the target of inspection, or only a part of the inspection target may be the target of the inspection. One inspection target may include a plurality of targets of inspection. The inspection target image may include a plurality of inspection targets. The inspection target can also be called a workpiece.

The image inspection apparatus 1 includes a control unit 2 serving as an apparatus main body, an imaging unit 3, a display device (display unit) 4, and a personal computer 5. The personal computer 5 is not essential, and may be omitted. Various information and images can be displayed by using the personal computer 5 instead of the display device 4. It has been illustrated in FIG. 1 that the control unit 2, the imaging unit 3, the display device 4, and the personal computer 5 are described as separate units as an example of a configuration example of the image inspection apparatus 1, but a plurality of components thereof may also be combined and integrated. For example, the control unit 2 and the imaging unit 3 can be integrated, or the control unit 2 and the display device 4 can be integrated. The control unit 2 may be divided into a plurality of units, and a part of the divided units may be incorporated in the imaging unit 3 or the display device 4. Alternatively, the imaging unit 3 may be divided into a plurality of units, and a part of the divided units may be incorporated in another unit.

(Configuration of Imaging Unit 3)

Figure 2:
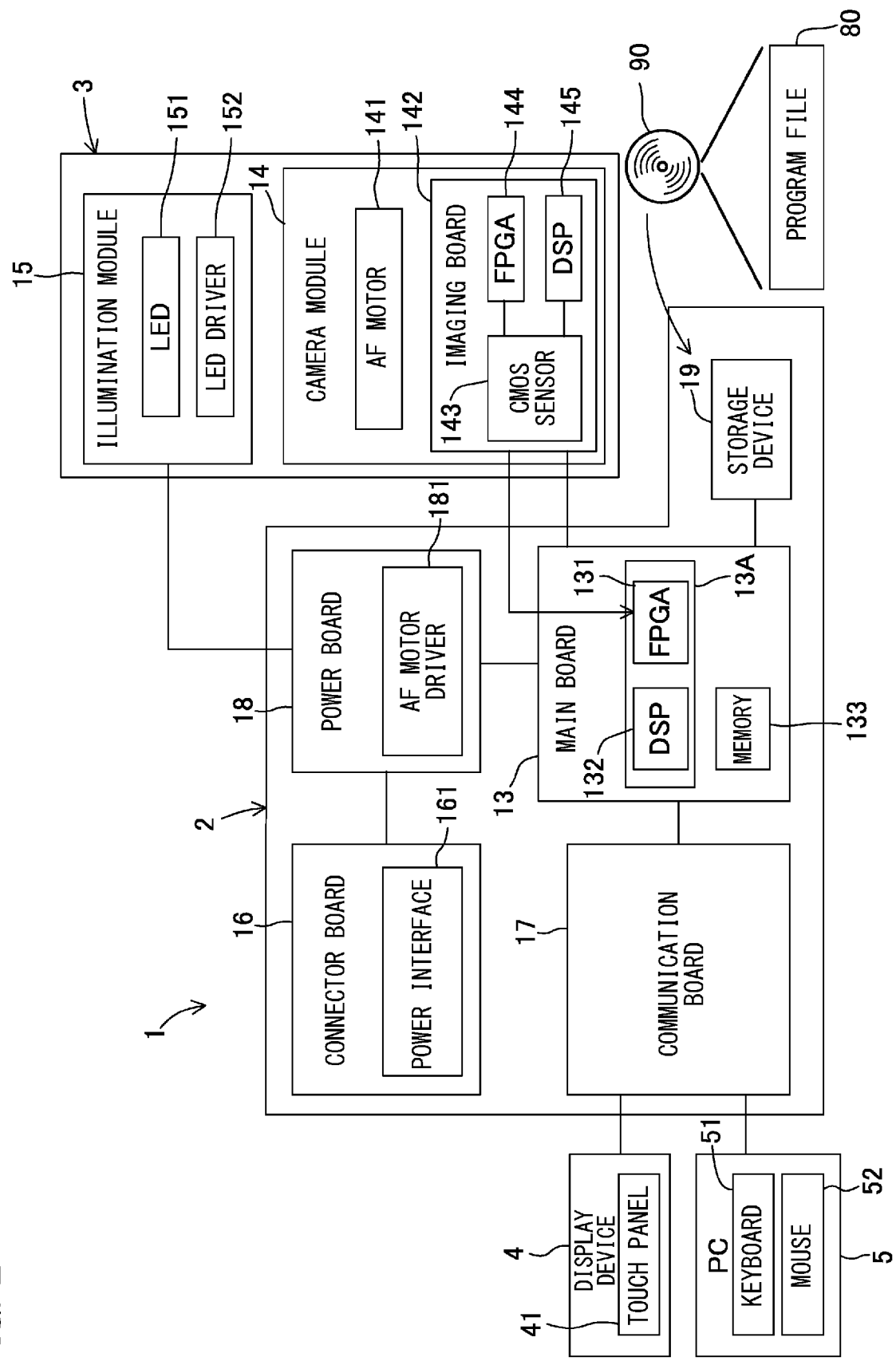
FIG. 2 is a diagram illustrating a hardware configuration of the image inspection apparatus.

As illustrated in FIG. 2, the imaging unit 3 includes a camera module (imaging unit) 14 and an illumination module (illumination unit) 15, and is a unit that executes the acquisition of the inspection target image.

The camera module 14 includes an AF motor 141 that drives an imaging optical system, and an imaging board 142. The AF motor 141 is a part that automatically performs focus adjustment by driving a lens of the imaging optical system, and can perform focus adjustment by a method such as contrast autofocus known in the related art. An imaging visual field range (imaging region) using the camera module 14 is set so as to include the inspection target. The imaging board 142 includes a CMOS sensor 143, an FPGA 144, and a DSP 145 as light receiving elements for receiving light incident from the imaging optical system. The CMOS sensor 143 is an imaging sensor configured to acquire a color image. For example, a light receiving element such as a CCD sensor may be used instead of the CMOS sensor 143. The FPGA 144 and the DSP 145 are used for executing image processing within the imaging unit 3, and a signal output from the CMOS sensor 143 is also input to the FPGA 144 and the DSP 145.

The illumination module 15 includes a light emitting diode (LED) 151 as a light emitter that illuminates an imaging region including the inspection target, and an LED driver 152 that controls the LED 151. A light emission timing, a light emission time, and a light emission amount of the LED 151 can be arbitrarily set by the LED driver 152. The LED 151 may be provided integrally with the imaging unit 3, or may be provided as an external illumination unit separately from the imaging unit 3. Although not illustrated, a reflector that reflects light emitted from the LED 151, a lens through which the light emitted from the LED 151 passes are provided in the illumination module 15. An emission range of the LED 151 is set such that the light emitted from the LED 151 is emitted to the inspection target and the surrounding region of the inspection target. Light emitters other than the light emitting diode may also be used.

(Configuration of Control Unit 2)

The control unit 2 includes a main board 13, a connector board 16, a communication board 17, and a power board 18. An FPGA 131, a DSP 132, and a memory 133 are mounted on the main board 13. The FPGA 131 and the DSP 132 constitute a control unit 13A, and a main control unit in which these components are integrated may be provided.

The control unit 13A of the main board 13 controls operations of each connected board and module. For example, the control unit 13A outputs an illumination control signal for controlling the turning on and off of the LED 151 to the LED driver 152 of the illumination module 15. The LED driver 152 switches between the turning on and off of the LED 151 and adjusts a turning-on time and adjusts a light amount of the LED 151 according to the illumination control signal from the control unit 13A.

The control unit 13A outputs an imaging control signal for controlling the CMOS sensor 143 to the imaging board 142 of the camera module 14. The CMOS sensor 143 starts imaging and performs imaging by adjusting an exposure time to any time according to the imaging control signal from the control unit 13A. That is, the imaging unit 3 captures a region within the visual field range of the CMOS sensor 143 according to the imaging control signal output from the control unit 13A. When the inspection target is present within the visual field range, the imaging unit captures the inspection target, and when an object other than the inspection target is present within the visual field range, the imaging unit also captures this object. For example, when the image inspection apparatus 1 is set, it is possible to capture a non-defective product image to which an attribute as a non-defective product is given by a user and a defective product image to which an attribute of a defective product is given. At the time of running the image inspection apparatus 1, the inspection target can be captured. The CMOS sensor 143 is configured to output a live image, that is, a currently captured image at a short frame rate as needed.

When the imaging using the CMOS sensor 143 is ended, an image signal output from the imaging unit 3 is input to the FPGA 131 of the main board 13, is processed by the FPGA 131 and the DSP 132, and is stored in the memory 133. Details of specific processing contents using the control unit 13A of the main board 13 will be described below.

The connector board 16 is a part that receives a power from the outside via a power connector (not illustrated) provided at a power interface 161. The power board 18 is a part that distributes the power received by the connector board 16 to each board and module, and specifically, distributes the power to the illumination module 15, the camera module 14, the main board 13, and the communication board 17. The power board 18 includes an AF motor driver 181. The AF motor driver 181 supplies a driving power to the AF motor 141 of the camera module 14, and realizes autofocus. The AF motor driver 181 adjusts the power supplied to the AF motor 141 according to an AF control signal from the control unit 13A of the main board 13.

The communication board 17 outputs a quality determination signal, image data, and a user interface of the inspection target output from the control unit 13A of the main board 13 to the display device 4, the personal computer 5, and an external control device (not illustrated). The display device 4 and the personal computer 5 includes a display panel constituted by, for example, a liquid crystal panel, and displays the image data and the user interface on the display panel.

The communication board 17 is configured to receive various operations of the user input from a touch panel 41 of the display device 4 and a keyboard 51 of the personal computer 5. The touch panel 41 of the display device 4 is, for example, a touch type operation panel having a pressure sensitive sensor mounted thereon known in the related art, detects a touch operation of the user, and outputs the detected touch operation to the communication board 17. The personal computer 5 includes the keyboard 51 and a mouse 52 as operation devices. The personal computer 5 may include a touch panel (not illustrated) as the operation device. The personal computer 5 is configured to receive various operations of the user input from these operation devices. Communication may be wired or wireless, and any communication form can be realized by a communication module known in the related art.

A storage device 19 such as a hard disk drive is provided in the control unit 2. The storage device 19 stores a program file 80 and a setting file (software) for causing each control and processing to be described below to be executable by the hardware. For example, the program file 80 and the setting file can be stored in a storage medium 90 such as an optical disk, and the program file 80 and the setting file stored in the storage medium 90 can be installed in the control unit 2. The storage device 19 can store the image data and a quality determination result.

(Specific Configuration of Image Inspection Apparatus 1)

Figure 3:
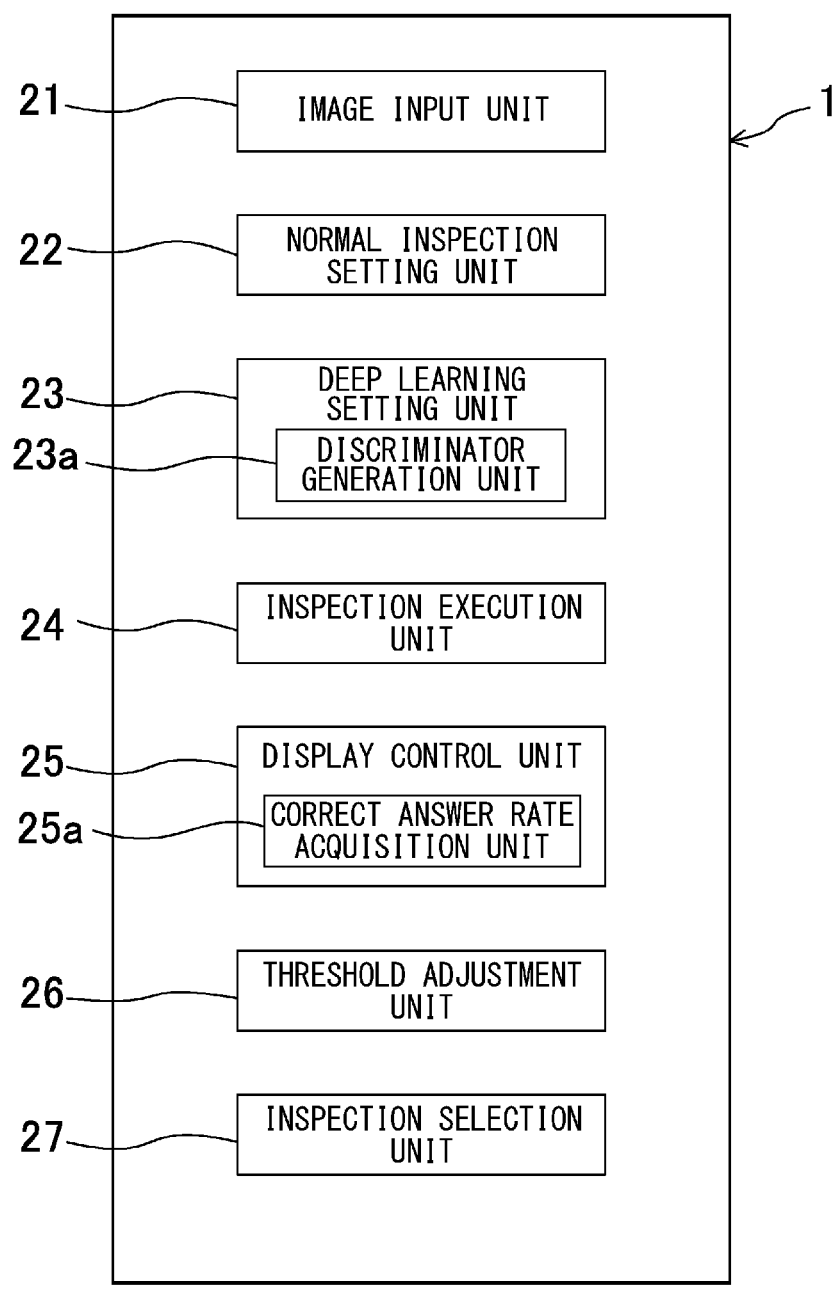
FIG. 3 is a block diagram of the image inspection apparatus.

FIG. 3 is a block diagram of the image inspection apparatus 1, and each unit illustrated in FIG. 3 is realized by the control unit 2 in which the program file 80 and the setting file are installed. That is, the image inspection apparatus 1 includes an image input unit 21, a normal inspection setting unit (an example of a normal inspection setting section) 22, a deep learning setting unit (an example of a deep learning setting section) 23, an inspection execution unit (an example of an inspection execution section) 24, a display control unit 25, a threshold adjustment unit (an example of a threshold adjustment section) 26, and an inspection selection unit (an example of an inspection selection section) 27. The display control unit 25 and the display device 4 constitute a display section. These units 21 to 27 and sections may be constituted only by hardware, or may be constituted by a combination of hardware and software. For example, the threshold adjustment unit 26 can include the keyboard 51 and the mouse 52.

Although each of the units 21 to 27 illustrated in FIG. 3 is conceptually independent, any two or more units may be integrated, and the present invention is not limited to the illustrated form.

Each of the units 21 to 27 and the sections may be constituted by independent hardware, or may be configured such that a plurality of functions is realized by one piece of hardware or software. Functions and actions of the units 21 to 27 and the sections illustrated in FIG. 3 can also be realized under the control of the control unit 13A of the main board 13.

The image inspection apparatus 1 is configured to perform at least two types of inspections, that is, an inspection of the inspection target through normal inspection processing and an inspection of the inspection target through deep learning processing. The normal inspection processing is general inspection processing using an image obtained by capturing the inspection target, and is processing for performing the quality determination of the inspection target based on various characteristic amounts (color, edge, and position) of the inspection target within the image. The normal inspection processing includes, for example, a pattern search, a difference inspection, a learning inspection, and a flaw detection, but may include other inspection processing.

Meanwhile, the deep learning processing is inspection processing using a learned neural network obtained by adjusting a plurality of parameters within the network such that the non-defective product image and the defective product image are discriminable by inputting at least one of an image to which a plurality of non-defective product attributes is given in advance and an image to which defective product attributes are given to a multilayer neural network. The neural network used herein has three or more layers, and is a neural network capable of performing so-called deep learning.

Although details will be described below, when a stable inspection is performed by only one inspection processing of the normal inspection processing and the deep learning processing, only one inspection processing is executable. In addition, for example, an inspection that is difficult to determine by the normal inspection processing can be determined with high accuracy by the deep learning processing by using both the normal inspection processing and the deep learning processing. An unstable behavior peculiar to the deep learning processing that may occur when unknown data not used for learning is input can be avoided by the inspection processing of only the normal inspection processing.

The image inspection apparatus 1 is switched between a setting mode in which various parameter settings such as an imaging setting, registering of a master image, setting of the normal inspection processing, and setting of the deep learning processing are performed and a running mode (Run mode) in which the quality determination of the inspection target is performed based on the inspection target image obtained by capturing the inspection target in an actual site. In the setting mode, the user can perform a preparatory work so as to separate the non-defective product from the non-defective product in a desired product inspection, and a learning work of the neural network is included in this work. The switching between the setting mode and the running mode is executable on a user interface (not illustrated), and can also be configured to automatically transition to the running mode simultaneously with the completion of the setting mode. The transition from the running mode to the setting mode can be arbitrarily performed. In the running mode, the neural network can be re-learned.

(Configuration of Image Input Unit 21)

The image input unit 21 illustrated in FIG. 3 is a part that inputs, to the deep learning setting unit 23, a plurality of non-defective product images to which non-defective product attributes are given and/or a plurality of defective product images to which defective product attributes are given in the setting mode, and is a part that inputs a registration image to the normal inspection setting unit 22. The image input unit 21 is also a part that inputs a newly acquired inspection target image to the inspection execution unit 24 in the running mode.

Specifically, in the setting mode, when the user places the inspection target in the visual field of the CMOS sensor 143 of the imaging unit 3, the control unit 13A incorporates the live image captured by the CMOS sensor 143 in a part of an image inputting user interface (not illustrated), and displays the user interface for image input in which the live image is incorporated on the display device 4. When the user performs an image obtaining operation in a state in which the inspection target is displayed on the image inputting user interface, an image displayed on the image inputting user interface at this point of time, that is, an image desired to be obtained by the user are obtained as still images. The obtained images are stored in the memory 133 or the storage device 19. Examples of the image obtaining operation of the user include a button operation incorporated in the image inputting user interface and operations of the keyboard 51 and the mouse 52.

The user can give one of the non-defective product attribute and the defective product attribute when the image is obtained. For example, a "non-defective product obtaining button" and a "defective product obtaining button" are provided in the image inputting user interface. When the image displayed on the image inputting user interface is obtained, in a case where a "non-defective product obtaining button" operation is performed, the image obtained at this point of time can be obtained as the non-defective product image to which the non-defective product attribute is given, and in a case where a "defective product obtaining button" operation is performed, the image obtained at this point of time can be obtained as the non-defective product image to which the defective product attribute is given. By repeating this, the plurality of non-defective product images and a plurality of defective product images can be obtained. When the plurality of non-defective product images is input, the input images may be images obtained by capturing different non-defective products, or may be images obtained by capturing one non-defective product multiple times while changing an angle and a position of one non-defective product. The plurality of non-defective product images and the plurality of defective product images may be generated by, for example, changing brightness of the image within the image inspection apparatus 1. The non-defective product image and the defective product image are prepared as, for example, about 100 images, respectively. For example, when a flaw is detected, a defective product image with a flaw is prepared. This defective product image may be created by the user, or may be automatically created by the image inspection apparatus 1.

As a deep learning image, only the defective product image or only the non-defective product image can be obtained. The method of giving the non-defective product attribute and the defective product attribute to the image is not limited to the aforementioned method, and may be, for example, a method of giving the attribute after the image is obtained. It is also possible to correct the attributes after the non-defective product attribute and the defective product attribute are given.

The user can obtain the registration image used in the normal inspection processing as the master image. For example, the registration image can be used when the difference inspection in which the quality determination is performed by detecting a blob (lump) of a difference from a newly acquired inspection target image. The registration image can be used when the quality determination is performed by using a normalized correlation. For example, a "registration image obtaining button" is provided in the image inputting user interface. When the image displayed on the image inputting user interface is obtained, in a case where the "registration image obtaining button" operation is performed, the image obtained at this point of time can be the registration image. After the image is obtained, the obtained image can be set as the registration image.

In the running mode, the control unit 13A obtains the inspection target image by capturing the inspection target by the CMOS sensor 143 in a state in which the inspection target is within the visual field of the CMOS sensor 143. The signal serving as a trigger for obtaining the inspection target image is known in the related art, and may be, for example, a signal input from outside the image inspection apparatus 1 or a signal generated inside the image inspection apparatus 1.

(Configuration of Normal Inspection Setting Unit 22)

The normal inspection setting unit 22 is a part that performs the setting of the normal inspection processing by receiving setting of the characteristic amount used for the normal inspection and setting of a normal inspection threshold which is a criterion of the quality determination to be compared with the characteristic amount from the user. The characteristic amount used for the normal inspection includes, for example, a color of the inspection target, an edge of the inspection target, and a position of the inspection target. Edge information of the inspection target includes a position, a shape, and a length of the edge. The position of the inspection target includes not only the position of the inspection target itself but also a position of a part of the inspection target. The number of characteristic amounts used for the normal inspection may be one, or two or more.

When the characteristic amount used for the normal inspection is set, a characteristic amount setting user interface (not illustrated) generated by the control unit 13A is displayed on the display device 4, and the operation of the user is received on the user interface for setting the characteristic amount. A characteristic amount setting unit for inputting and selecting the above-described characteristic amount is provided on the characteristic amount setting user interface. When the user performs an input operation on the characteristic amount setting unit by using the keyboard 51 and the mouse 52, the input operation is received by the control unit 13A, and the setting of the characteristic amount used for the inspection is completed. The set characteristic amount is stored in the memory 133 or the storage device 19.

The characteristic amount set as described above is compared with the normal inspection threshold which is the criterion of the quality determination, and the inspection execution unit 24 to be described below determines whether the inspection target image is the non-defective product or the defective product as a comparison result. When the normal inspection threshold which is the criterion of the quality determination used at this time is set, a threshold setting user interface (not illustrated) generated by the control unit 13A is displayed on the display device 4, and the operation of the user is received on the threshold setting user interface. A threshold input unit for inputting the normal inspection threshold is provided on the threshold setting user interface. When the user performs a threshold input operation on the threshold input unit by using the keyboard 51 or the mouse 52, the input operation is received by the control unit 13A, and the input and setting of the threshold are completed. The set normal inspection threshold is stored in the memory 133 or the storage device 19. A final input may be completed by automatically setting the normal inspection threshold by the image inspection apparatus 1 and then adjusting the set normal inspection threshold by the user. The normal inspection threshold is a threshold used in the normal inspection processing, and is not used in the inspection of the deep learning processing.

When the normal inspection threshold is received from the user, a non-defective product confirming threshold for confirming a non-defective product determination and a defective product confirming threshold for confirming a defective product determination may be received.

The non-defective product confirming threshold is a threshold for determining that the product is the non-defective product when the comparison result is equal to or larger than the threshold or the product is the non-defective product when the comparison result is equal to or smaller than the threshold by using this threshold as a criterion. A threshold having high accuracy with which the product is confirmable as the non-defective product can be set. Meanwhile, the defective product confirming threshold is a threshold for determining that the product is the defective product when the comparison result is equal to or larger than the threshold or the product is the defective product when the comparison result is equal to or smaller than the threshold by using this threshold as a criterion. A threshold having high accuracy with which the product is confirmable as the defective product can be set. Any one of the non-defective product confirming threshold or the defective product confirming threshold may be received, or both may be received. When the non-defective product confirming threshold and the defective product confirming threshold are input, these thresholds are stored in the memory 133 and the storage device 19 in a discriminable state.

(Configuration of Deep Learning Setting Unit 23)

The deep learning setting unit 23 is a part that causes the neural network to learn by inputting the plurality of non-defective product images to which the non-defective product attributes are given and/or the plurality of defective product images to which the defective product attributes are given to an input layer of the neural network, and performs the setting of the deep learning processing for classifying the newly acquired inspection target images into the non-defective product images and the defective product images. The neural network can be constructed on the control unit 13A, and has at least an input layer, an intermediate layer, and an output layer.

Since the non-defective product image and the defective product image are acquired by the image input unit 21, the deep learning setting unit 23 inputs the non-defective product image and the defective product image acquired by the image input unit 21 to the input layer of the neural network. In the input layer of the neural network, only the non-defective product image may be input, only the defective product image may be input, or both the non-defective product image and the defective product image may be input. Such an input may be automatically changed according to an image acquisition status, or may be selected by the user.

The deep learning setting unit 23 also provides correct answer information (whether the input image is the non-defective product or the defective product) to the neural network, and causes the neural network to learn by using the plurality of non-defective product images and/or the plurality of defective product images and the correct answer information. Accordingly, parameters having a high correct answer rate are obtained by changing a plurality of initial parameters of the neural network. The learning of the neural network can be automatically performed at a point of time when the non-defective product image or the defective product image is input. By causing the neural network to learn, a discriminator capable of discriminating between the non-defective product image and the defective product image can be generated, and the newly acquired inspection target images can be classified into the non-defective product images and the defective product images by the discriminator. This discriminator can be generated by a discriminator generation unit 23*a* illustrated in FIG. 3.

The neural network may be a discrimination type network based on a convolutional neural network (CNN) or a restoration type neural network represented by an auto encoder. In the case of the discrimination type network, a value (a normalization function called a softmax function is generally used) obtained by normalizing an output value can be set as a threshold (deep learning processing threshold) which is the criterion of the quality determination. The deep learning processing threshold can include a non-defective product determining threshold which is a criterion of the non-defective product determination and a defective product determining threshold which is a criterion of the defective product determination, and a value obtained by normalizing any of these thresholds can be used. The deep learning processing threshold and the normal inspection threshold are independent.

In the case of the restoration type neural network, particularly, the auto encoder, for example, the learning is executable in advance such that non-defective product image data is input in the setting mode and the input data is restored and output with no change. In the running mode, the newly acquired inspection target image is input to the learned neural network, and the input image is obtained as a restored image. A difference between the image input to the neural network and the restored image is obtained, and when the difference is equal to or larger than a predetermined value, it is possible to determine that the product is the defective product, and when the difference is smaller than the predetermined value, it is possible to determine that the product is the non-defective product. There are a method of determining the sum of differences between gradation values of the images input to the neural network and the restored images and a method of determining the sum of the number of pixels of which a difference is equal to or larger than a predetermined value. As described above, the deep learning processing threshold may be decided by using the number of pixels or an area of the image.

(Configuration of Inspection Execution Unit 24)

The inspection execution unit 24 is configured to apply the normal inspection processing and the deep learning processing to both the newly acquired non-defective product images to which the non-defective product attributes are given and the newly acquired defective product images to which the defective product attributes are given. The newly acquired non-defective product images to which the non-defective product attributes are given and the newly acquired defective product images to which the defective product attributes are given are images acquired after setting of the normal inspection setting unit 22 for the normal inspection processing and the setting of the deep learning setting unit 23 for the deep learning processing are ended.

The inspection execution unit 24 is configured to perform both the inspection in the setting mode and the inspection in the running mode.

The inspection execution unit 24 calculates a correct answer rate when the normal inspection processing is performed on the non-defective product images by applying the normal inspection processing to the newly acquired non-defective product images, and calculates a correct answer rate when the normal inspection processing is performed on the defective product images by applying the normal inspection processing to the newly acquired defective product images. The inspection execution unit 24 calculates a correct answer rate when the deep learning processing is performed on the non-defective product images by applying the deep learning processing to the newly acquired non-defective product images, and calculates a correct answer rate when the deep learning processing is performed on the defective product images by applying the deep learning processing to the newly acquired defective product images.

The correct answer rate is, for example, certainty (accuracy) of whether or not the product is the non-defective product. In the case of the deep learning processing, it is determined whether the image is close to the non-defective product image or the defective product image based on the value obtained by normalizing the output value, and thus, it is possible to determine that a possibility of the non-defective product becomes higher as the image becomes closer to the non-defective product and a possibility of the non-defective product becomes lower as the image becomes closer to the defective product. Based on this determination, the correct answer rate when the deep learning processing is performed can be calculated, and for example, the magnitude of the possibility of the non-defective product is displayed with high or low as illustrated on a horizontal axis of FIG. 4.

Meanwhile, in the case of the normal inspection processing, the method of calculating the correct answer rate is different depending on the inspection method. As described above, the inspection method includes a pattern search, a difference inspection, a learning inspection, and a flaw detection. In the case of the pattern search, a portion (pattern) desired to be inspected is registered in the setting mode, the registered pattern and a pattern included in the newly acquired inspection target image are determined by using the normalized correlation, and the quality determination is performed based on an obtained correlation value. When the correlation value is equal to or larger than a predetermined value, it is determined that the product is the non-defective product, and when the correlation value is smaller than the predetermined value, it is determined that the product is the defective product.

Figure 4:
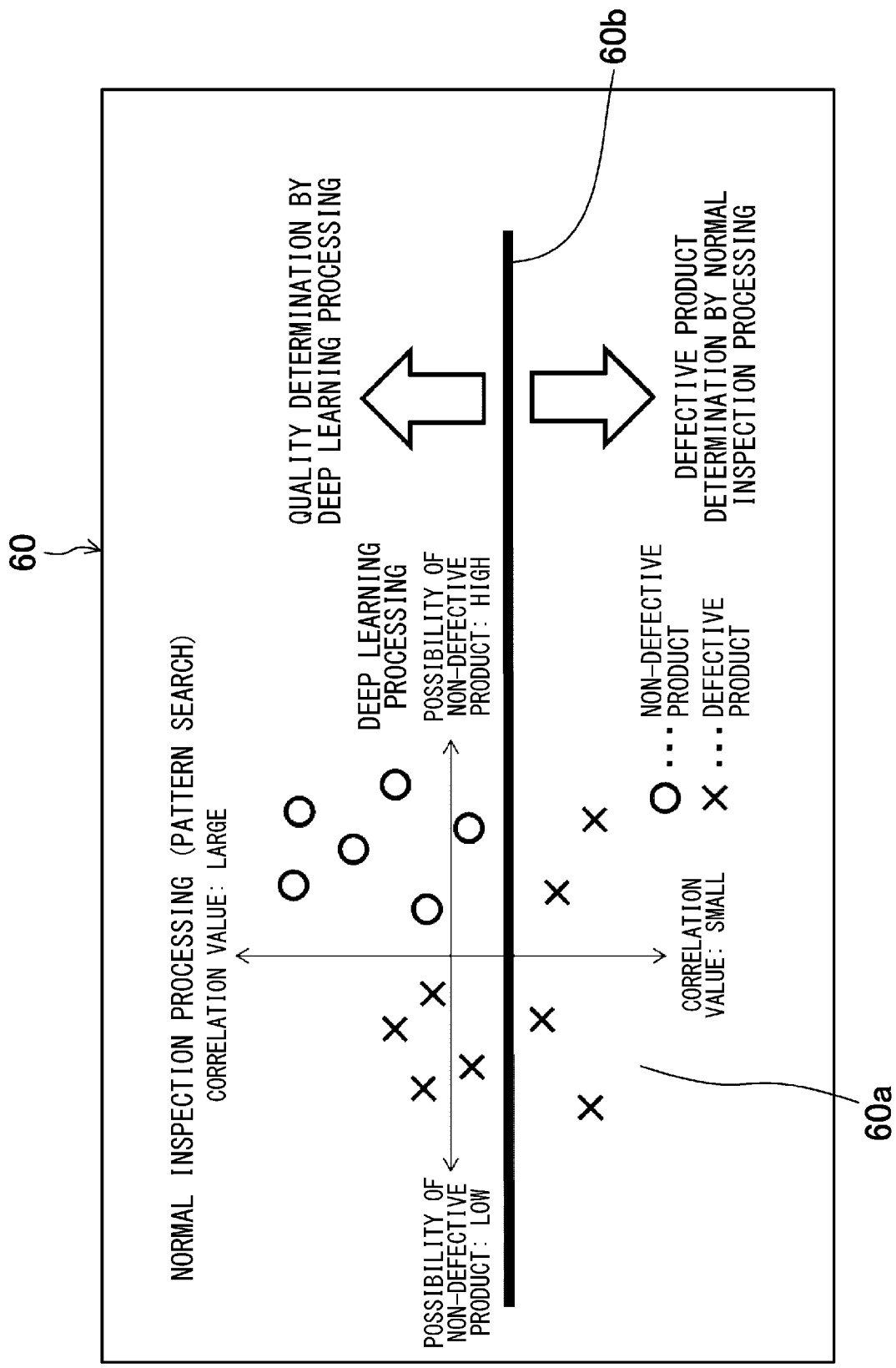
FIG. 4 is a diagram illustrating a user interface displayed when a pattern search and deep learning processing are combined.

Therefore, as represented on a vertical axis of FIG. 4, the correct answer rate can be displayed according to the magnitude of the correlation value, and the correct answer rate can be displayed in association with the correlation value. In the case of the pattern search, the correlation value can be a threshold. The possibility of the non-defective product when the deep learning processing is performed may be represented on the vertical axis, and the correlation value of the pattern search may be represented on the horizontal axis. The same applies to the following examples.

In the case of the difference inspection, the image is registered in advance in the setting mode, and the quality determination is performed by detecting a blob of a difference between the registration image and the newly acquired inspection target image. When a blob area of the difference is equal to or smaller than a predetermined value, it is determined that the product is the non-defective product, and when the blob area of the difference is large, it is determined that the product is the defective product. Therefore, as represented on a vertical axis of FIG. 5, the correct answer rate can be displayed according to the size of the blob area of the difference, and the correct answer rate can be displayed in association with the blob area of the difference. In the case of the difference inspection, the blob area of the difference can be a threshold.

The learning inspection is a method described in JP 5767963 B, and is, for example, a method of automatically defining a range of the non-defective product by causing a plurality of non-defective product images to be learned and detecting the product which is "not the non-defective product". The learning inspection is a method of detecting a defect based on the total (defect amount) of gradation values deviating from a variation range of pixels based on statistics and the area such as the number of pixels (area of a defective portion).

In the case of the learning inspection, when the defect amount or the area of the defective portion is equal to or smaller than a predetermined value, it is determined that the product is the non-defective product, and when the defect amount or the area of the defective portion is larger than the predetermined value, it is determined that the product is the defective product. Therefore, as represented on a vertical axis of FIG. 6, the correct answer rate can be displayed based on the sizes of the defect amount and the area of the defective portion. In the case of the learning inspection, the threshold may be the defect amount or the area of the defective portion.

As the flaw detection, a method described in JP 4544578 B, for example, a method of deciding an inspection region within an image, setting an N×N segment for pixels included in the inspection region, calculating an average density of densities of the pixels included in each segment while shifting the segment in a predetermined direction, and calculating, as a defect level, a difference value between the average density of one segment and the average density of another adjacent segment can be adopted. Accordingly, it is possible to detect the flaw on the inspection target.

In the case of the flaw detection, when the defect level or the area of the defective portion is equal to or smaller than a predetermined value, it is determined that the product is the non-defective product, and when the defect level or the area of the defective portion is larger than the predetermined value, it is determined that the product is the defective product. Therefore, as represented on a vertical axis of FIG. 7, the correct answer rate can be displayed based on the sizes of the defect amount and the area of the defective portion.

In the case of the flaw detection, the threshold may be the defect level or the area of the defective portion.

(Configuration of Display Control Unit 25)

The display control unit 25 includes a correct answer rate acquisition unit 25a that acquires a correct answer rate through the normal inspection processing executed by the inspection execution unit 24 and a correct answer rate through the deep learning processing executed by the inspection execution unit 24 by reading each correct answer rate calculated by the inspection execution unit 24. The display control unit 25 is configured to display the correct answer rate through the normal inspection processing executed by the inspection execution unit 24 and the correct answer rate through the deep learning processing executed by the inspection execution unit 24 in a comparable form on the display device 4.

Specifically, the display control unit 25 generates a first user interface 60 displayed when the pattern search and the deep learning processing are combined as illustrated in FIG. 4. A graph display region 60a is formed on the first user interface 60. A vertical axis of a graph displayed in the graph display region 60a indicates the magnitude of the correlation value obtained by the pattern search as the normal inspection processing. As the magnitude becomes closer to the upper side, the correlation value becomes larger, that is, the possibility of the non-defective product is set to be increased. That is, the correct answer rate through the normal inspection processing can be displayed in association with the correlation value of the pattern search.

A horizontal axis of the graph displayed in the graph display region 60a indicates the magnitude of the possibility of the non-defective product obtained by the deep learning processing. As the magnitude becomes closer to the right side, the possibility of the non-defective product becomes higher, that is, the possibility of the non-defective product is set to be increased. In the graph, "○" indicates the non-defective product image, and "×" indicates the defective product image. The correct answer rate through the normal inspection processing and the correct answer rate through the deep learning processing are simultaneously displayed on the same graph, and thus, it is possible to easily compare the two correct answer rates.

The display form of the correct answer rate through the normal inspection processing and the correct answer rate through the deep learning processing is not limited to the graph illustrated in FIG. 4, but may be, for example, a display form in which the two correct answer rates can be compared by numerical values, or may be another display form.

Figure 5:
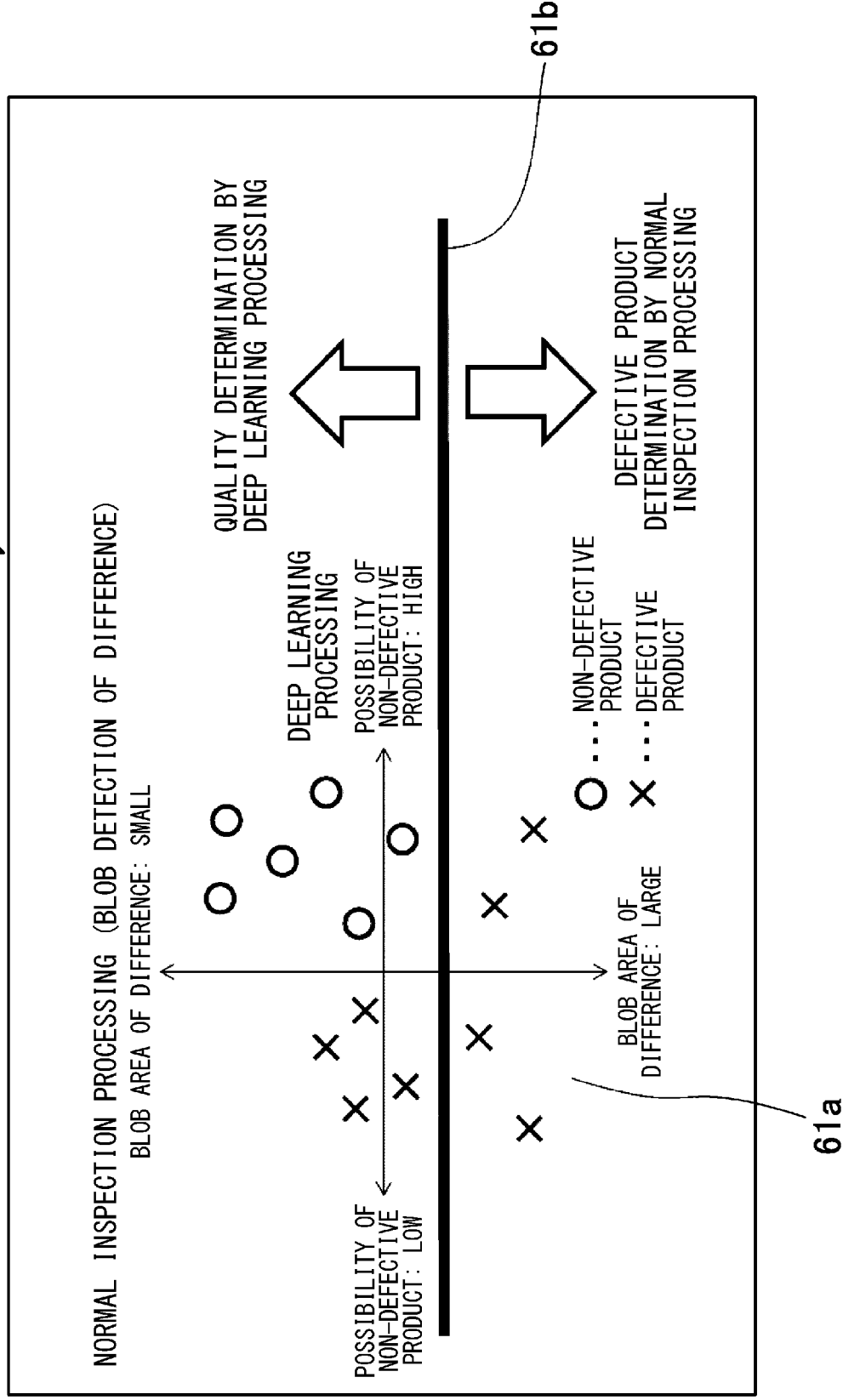
FIG. 5 is a diagram illustrating a user interface displayed when a difference inspection and the deep learning processing are combined.

In the case of the difference inspection, the display control unit 25 generates a second user interface 61 displayed when the difference inspection and the deep learning processing are combined as illustrated in FIG. 5. A graph display region 61a similar to that of the first user interface 60 is provided on the second user interface 61. A vertical axis of a graph displayed in the graph display region 61a indicates the size of the blob area of the difference obtained by the difference inspection as the normal inspection processing. As the size becomes closer to the upper side, the blob area of the difference becomes smaller, that is, the possibility of the non-defective product is set to be increased.

That is, it is possible to display the correct answer rate through the normal inspection processing in association with the blob area of the difference. A horizontal axis of the graph displayed in the graph display region 61a is identical to that of the first user interface 60.

Figure 6:
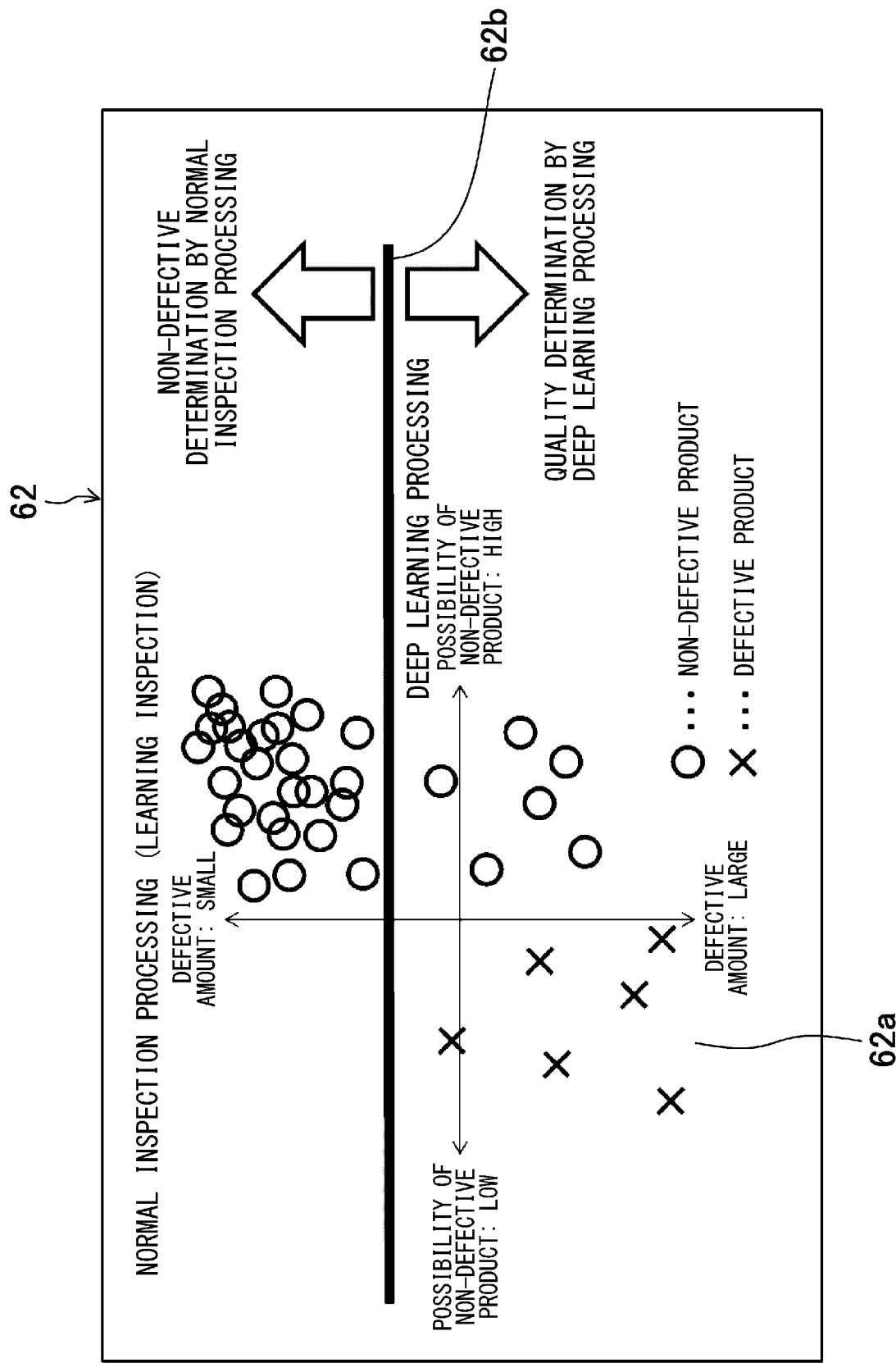
FIG. 6 is a diagram illustrating a user interface displayed when a learning inspection and deep learning processing are combined.

In the case of the learning inspection, the display control unit 25 generates a third user interface 62 displayed when the learning inspection and the deep learning processing are combined as illustrated in FIG. 6. A graph display region 62*a* similar to that of the first user interface 60 is provided on the third user interface 62. A vertical axis of a graph displayed in the graph display region 62*a* indicates the size of the defect amount obtained by the learning inspection as the normal inspection processing. As the size becomes closer to the upper side, the defect amount becomes smaller, that is, the possibility of the non-defective product is set to be increased. A horizontal axis of the graph displayed in the graph display region 62*a* is identical to that of the first user interface 60.

Figure 7:
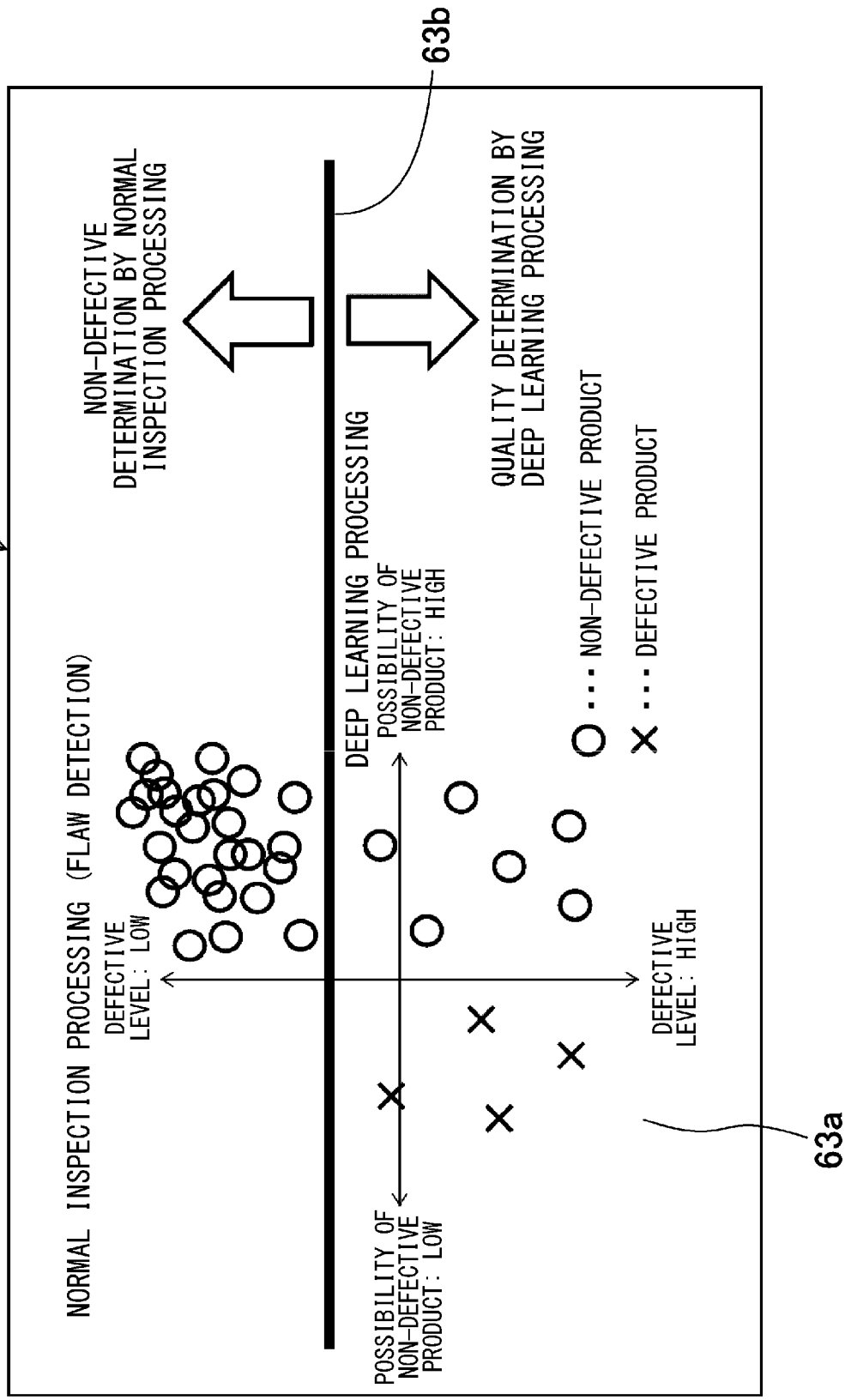
FIG. 7 is a diagram illustrating a user interface displayed when flaw detection and deep learning processing are combined.

In the case of the flaw detection, the display control unit 25 generates a fourth user interface 63 displayed when the flaw detection and the deep learning processing are combined as illustrated in FIG. 7. A graph display region 63*a* similar to that of the first user interface 60 is provided on the fourth user interface 63. A vertical axis of a graph displayed in the graph display region 63*a* indicates the size of the defect level obtained by the flaw detection as the normal inspection processing. As the size becomes closer to the upper side, the defect level becomes smaller, that is, the possibility of the non-defective product is set to be increased. A horizontal axis of the graph displayed in the graph display region 63*a* is identical to that of the first user interface 60.

(Configuration of Threshold Adjustment Unit 26)

On the first user interface 60 illustrated in FIG. 4, a normal inspection threshold display line 60*b* extending parallel to the horizontal axis is displayed, and the determination result of the normal inspection processing is displayed together with the threshold of the normal inspection processing. The normal inspection threshold display line 60*b* is a line indicating the normal inspection threshold. Instead of the normal inspection threshold display line 60*b* or in addition to the normal inspection threshold display line 60*b*, a display form capable of indicating the normal inspection threshold may be adopted, for example by painting the background in different colors or a form for displaying the threshold as the numerical value may be used.

The user can move the normal inspection threshold display line 60*b* in a vertical direction (in a direction in which the normal inspection threshold is increased or decreased) by using the keyboard 51 or the mouse 52. The correlation value which is the normal inspection threshold is increased or decreased depending on a position of the normal inspection threshold display line 60*b*. The correlation value is increased when the normal inspection threshold display line 60*b* is moved upward, while the correlation value is decreased when the normal inspection threshold display line 60*b* is moved downward. The threshold adjustment unit 26 changes the normal inspection threshold by detecting a moving state of the normal inspection threshold display line 60*b* by the user. The method of adjusting the normal inspection threshold is not limited to the aforementioned method, and may be adjustable by inputting the numerical value, for example.

A normal inspection threshold display line 61*b* similar to that of the first user interface 60 is displayed on the second user interface 61 illustrated in FIG. 5. The user moves the normal inspection threshold display line 61*b* in the vertical direction, and thus, a blob area value of the difference which is the normal inspection threshold is increased or decreased. When the normal inspection threshold display line 60*b* is moved upward, the blob area value of the difference is decreased, and when the normal inspection threshold display line 60*b* is moved downward, the blob area value of the difference is increased.

A normal inspection threshold display line 62*b* similar to that of the first user interface 60 is displayed on the third user interface 62 illustrated in FIG. 6. The user moves the normal inspection threshold display line 62*b* in the vertical direction, and thus, the defect amount which is the normal inspection threshold is increased or decreased. When the normal inspection threshold display line 60*b* is moved upward, the defect amount is decreased, and when the normal inspection threshold display line 60*b* is moved downward, the defect amount is increased.

A normal inspection threshold display line 63*b* similar to that of the first user interface 60 is displayed on the fourth user interface 63 illustrated in FIG. 7. The user moves the normal inspection threshold display line 63*b* in the vertical direction, and thus, the defect level which is the normal inspection threshold is increased or decreased. When the normal inspection threshold display line 60*b* is moved upward, the defect level is decreased, and when the normal inspection threshold display line 60*b* is moved downward, the defect level is increased.

(Combination of Normal Inspection Processing and Deep Learning Processing)

In this embodiment, the inspection execution unit 24 illustrated in FIG. 3 is configured to perform the inspection by combining the normal inspection processing and the deep learning processing. Hereinafter, a procedure of three cases of a case where the defective product determination is performed by the normal inspection processing and the quality determination is performed on the remaining product by the deep learning processing, a case where the non-defective product determination is performed by the normal inspection processing and the quality determination is performed on the remaining product by the deep learning processing, and a case where the non-defective product determination and the defective product determination are confirmed by the normal inspection processing and the quality determination is performed on the remaining product by the deep learning processing will be described.

Figure 8:
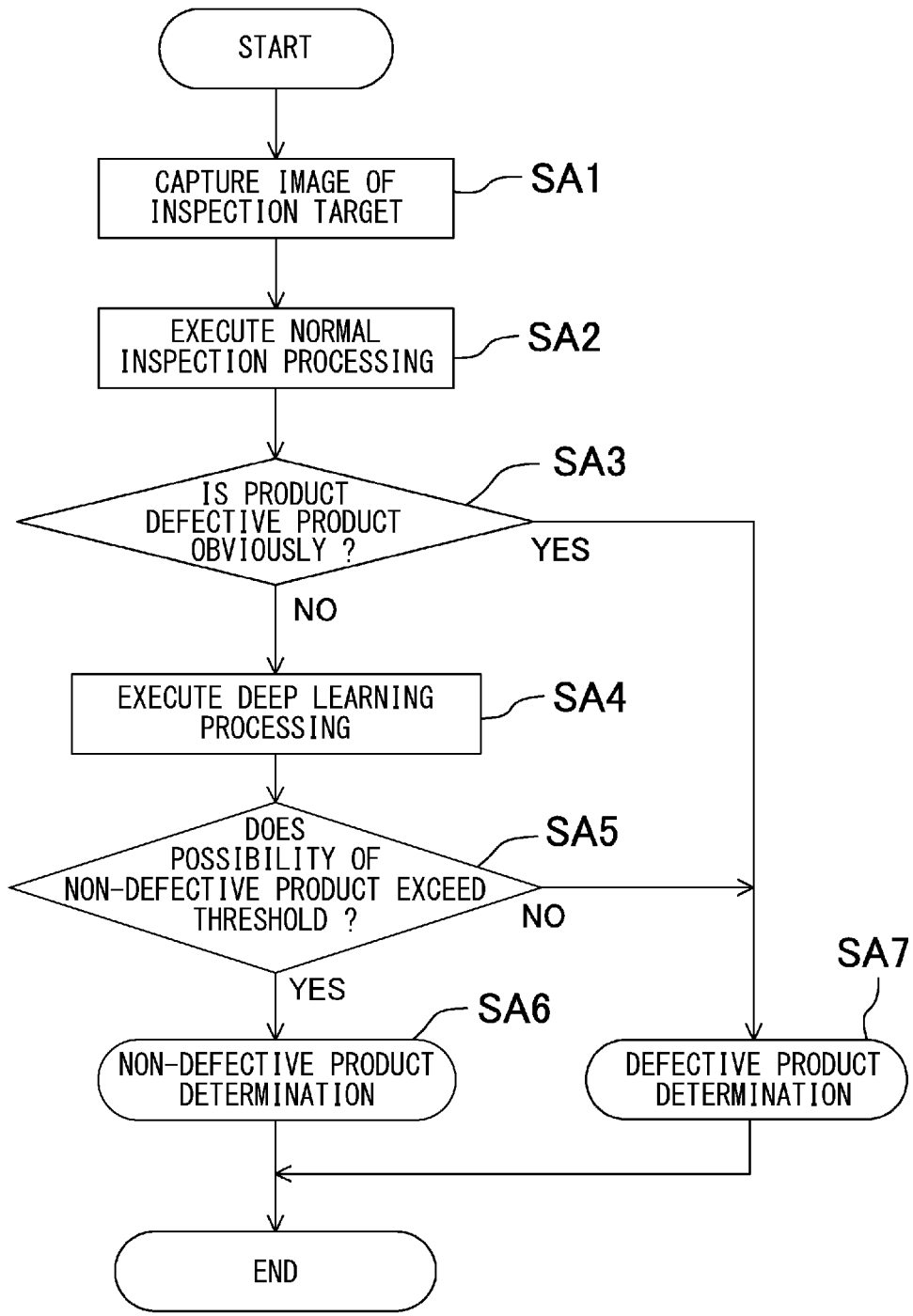
FIG. 8 is a flowchart illustrating a procedure when a defective product determination is performed by a normal inspection processing and the quality determination is performed on the remaining product by the deep learning processing.

1. Case where Defective Product Determination is Performed by Normal Inspection Processing and Quality Determination is Performed on Remaining Product by Deep Learning Processing FIG. 8 is a flowchart illustrating a procedure in a case where the defective product determination is performed by the normal inspection processing and the quality determination is performed on the remaining product by the deep learning processing. This procedure is a processing procedure that can be applied to the case where the pattern search and the deep learning processing illustrated in FIG. 4 are combined and the case where the difference inspection and the deep learning processing illustrated in FIG. 5 are combined.

After the start of the flowchart illustrated in FIG. 8, the inspection target is captured in step SA1. The control unit 13A controls the CMOS sensor 143, and thus, the inspection target can be captured. Specifically, the inspection target is captured by the image input unit 21 illustrated in FIG. 3.

In step SA2, the inspection execution unit 24 performs the inspection through the normal inspection processing on the inspection target image acquired in step SA1. In step SA3, it is determined whether or not the image is obviously the defective product image as a result of the inspection through the normal inspection processing performed in step SA2. This determination is executable based on the normal inspection threshold. For example, in the case of the pattern search illustrated in FIG. 4, the correlation value corresponding to the normal inspection threshold (indicated by the normal inspection threshold display line 60*b*) and the correlation value obtained in step SA2 are compared. When the correlation value obtained in step SA2 is equal to or smaller than the normal inspection threshold, it is determined that the image is obviously the defective product image. In the case of the difference inspection illustrated in FIG. 5, it is possible to similarly perform the determination based on the size of the blob area.

The normal inspection threshold used in step SA3 is a threshold for confirming the defective product determination. Therefore, in step SA3, the defective product determination is confirmed for the inspection target image having the characteristic amount with which the defective product determination is executable, while the defective product determination is not confirmed for the inspection target image for which the defective product determination is not confirmable. Thereafter, the processing proceeds to the next step.

When YES is determined in step SA3, the processing proceeds to step SA7. The determination of YES in step SA3 indicates that the defective product determination is confirmed. Therefore, the image is obviously the defective product image, and in this case, the image is finally determined as the defective product image in step SA7. That is, since the determination result is confirmable for the image that can be obviously determined to be the defective product image without performing the deep learning processing, a high processing speed is maintained.

Meanwhile, when NO is determined in step SA3, the processing proceeds to step SA4. The determination of NO in step SA3 indicates that the defective product determination is not confirmable, and it is not clear whether the image is the defective product image or the non-defective product image. In this case, in step SA4, the inspection through the deep learning processing having a higher discrimination ability than that of the normal inspection processing is performed. Since the image on which the deep learning processing is executed does not include the image that is obviously determined to be the defective product image, the instability of the behavior when unknown data is input like a case where an unexpected defect peculiar to the deep learning processing is mixed is eliminated, and determination accuracy can be improved.

Thereafter, in step SA5, it is determined whether or not the possibility of the non-defective product obtained by the deep learning processing exceeds the deep learning processing threshold. When NO is determined in step SA5, it is determined that the image is the defective product image by the deep learning processing having a high discrimination ability. The processing proceeds to step SA7, and the determination that the image is the defective product image is confirmed. Meanwhile, when NO is determined in step SA5, since the image is the non-defective product image, the determination that the image is the non-defective product image is confirmed in step SA6.

Figure 9:
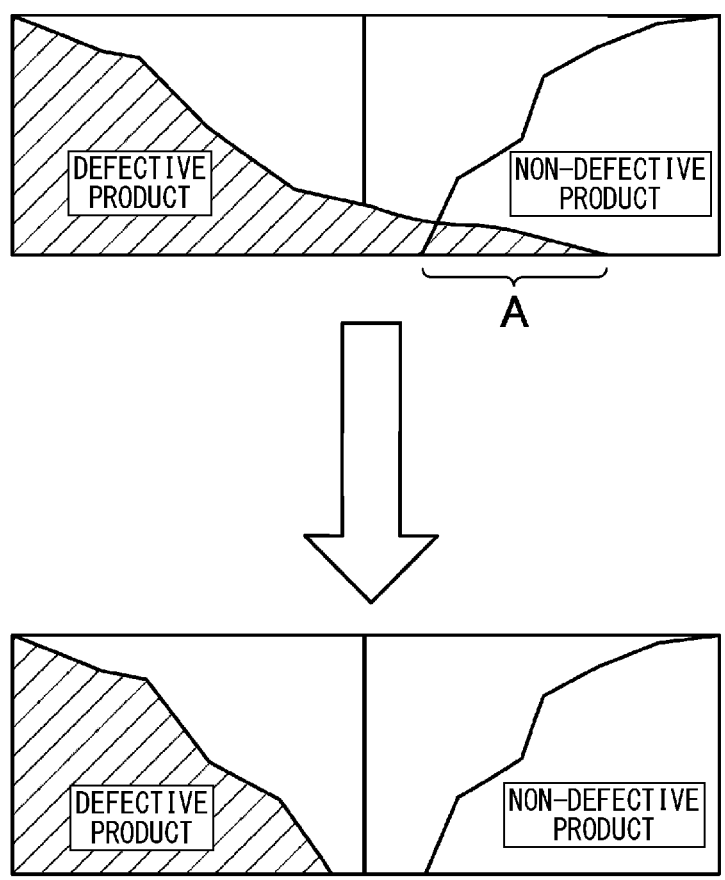
FIG. 9 is a diagram illustrating a cumulative histogram of only the deep learning processing and a cumulative histogram when the normal inspection processing and the deep learning processing are combined.

Through such a procedure, an effect as illustrated in FIG. 9 can be obtained. The diagram illustrated on an upper side of FIG. 9 is a histogram of the output values when the quality determination is performed only by the deep learning processing. When the quality determination is performed only by the deep learning processing, there is a region A in which the defective product image and the defective product image are mixed. That is, in the deep learning processing, the image obviously determined to be the defective product image is determined to be the non-defective product image due to the unstable behavior, and the defective product image and the defective product image cannot be separated. Meanwhile, through the procedure of the flowchart illustrated in FIG. 8, since the deep learning processing is not performed on the image obviously determined to be the defective product image, the defective product image and the defective product image can be separated as illustrated on a lower side of FIG. 9.

That is, as illustrated in the flowchart of FIG. 8, whether to end the inspection only by the normal inspection processing or the inspection processing in which the normal inspection processing and the deep learning processing are combined is selected according to the result obtained by performing the normal inspection processing on the inspection target image. This selection is executed by the inspection selection unit 27 illustrated in FIG. 3. For example, in the case of the pattern search, when the correlation value obtained by the normal inspection processing is equal to or smaller than the threshold (predetermined correlation value) used in step SA3, since it is possible to determine that the product is the defective product by the normal inspection processing, the inspection selection unit 27 ends the inspection only by the normal inspection processing. Meanwhile, when the correlation value obtained by the normal inspection processing is larger than the predetermined correlation value, the inspection selection unit 27 selects the deep learning processing.

In the case of the difference inspection, a procedure is identical to the procedure of the flowchart illustrated in FIG. 8. When the blob area of the difference obtained by the normal inspection processing is equal to or larger than a predetermined area value, since it is possible to determine that the product is the defective product by the normal inspection processing, the inspection selection unit 27 ends the inspection only by the normal inspection processing. Meanwhile, when the blob area of the difference obtained by the normal inspection processing is smaller than the predetermined area value, the inspection selection unit 27 selects the deep learning processing.

Figure 10:
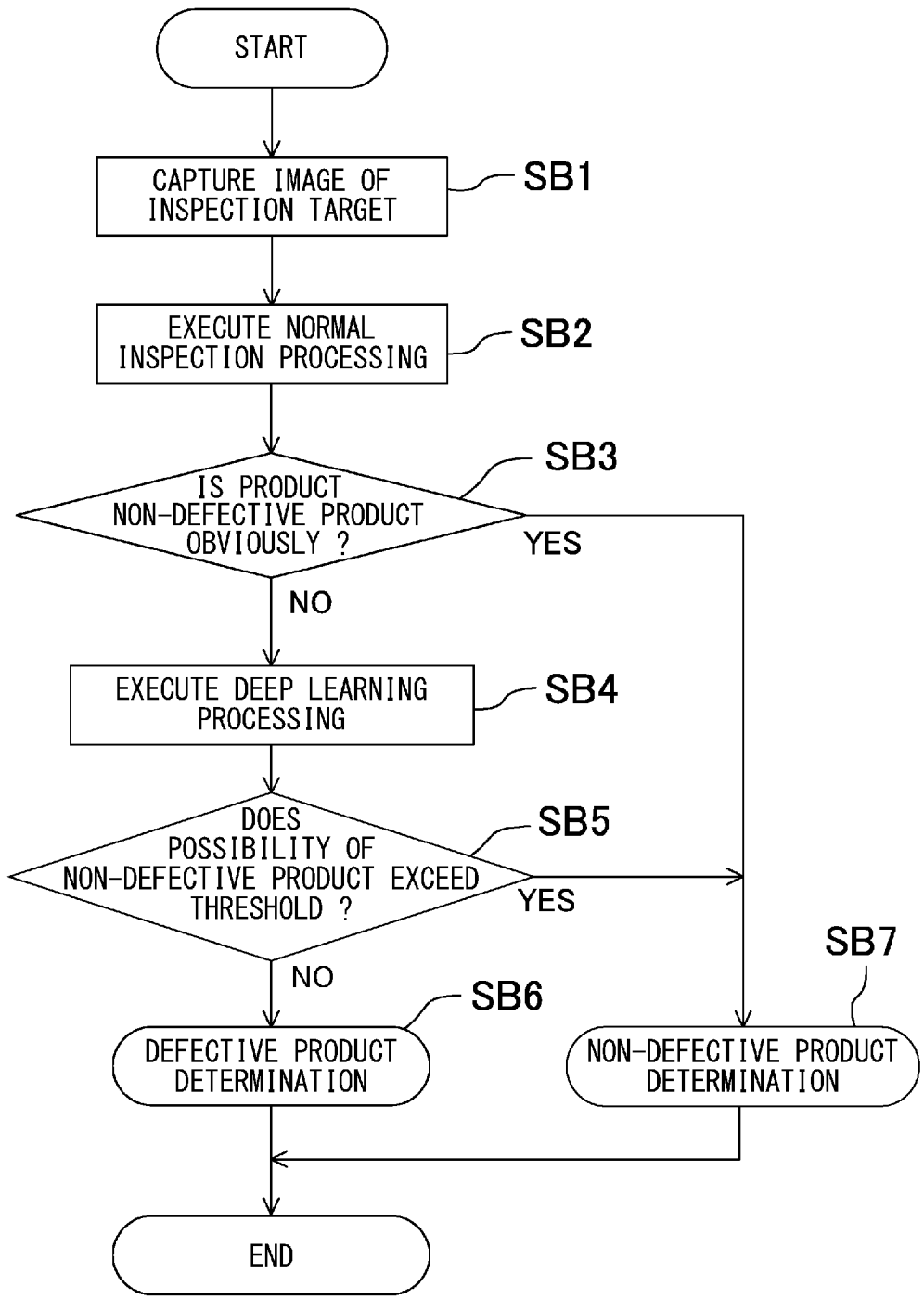
FIG. 10 is a flowchart illustrating a procedure when a non-defective product determination is performed by the normal inspection processing and the quality determination is performed on the remaining product by the deep learning processing.

2. Case where Non-Defective Product Determination is Performed by Normal Inspection Processing and Quality Determination is Performed on Remaining Product by Deep Learning Processing FIG. 10 is a flowchart illustrating a procedure when the non-defective product determination is performed by the normal inspection processing and the quality determination is performed on the remaining product by the deep learning processing. This procedure is a processing procedure that can be applied to a case where the learning inspection and the deep learning processing illustrated in FIG. 6 are combined and a case where the flaw detection and the deep learning processing illustrated in FIG. 7 are combined.

After the start of the flowchart illustrated in FIG. 10, steps SB1 and SB2 are identical to steps SA1 and SA2 of the flowchart illustrated in FIG. 8. In step SB3, it is determined whether or not the image is obviously the non-defective product image as a result of the inspection through the normal inspection processing performed in step SB2. This determination is executable based on the normal inspection threshold. For example, in the case of the learning inspection illustrated in FIG. 6, the defect amount corresponding to the normal inspection threshold (indicated by the normal inspection threshold display line 62*b*) and the defect amount obtained in step SB2 are compared. When the defect amount obtained in step SB2 is equal to or smaller than the normal inspection threshold, it is determined that the image is obviously the non-defective product image. In the case of the flaw detection illustrated in FIG. 7, the determination is similarly executable.

The normal inspection threshold used in step SB3 is a threshold for confirming the non-defective product determination. Therefore, in step SB3, the non-defective product determination is confirmed for the inspection target image having the characteristic amount with which the non-defective product determination is executable, while the non-defective product determination is not confirmed for the inspection target image for which the non-defective product determination is not confirmable. Thereafter, the processing proceeds to the next step.

When YES is determined in step SB3, the processing proceeds to step SB7. The determination of YES in step SB3 indicates that the non-defective product is confirmed. Therefore, the image is obviously the non-defective product image, and in this case, the image is finally determined to be the non-defective product image in step SB7. That is, since the determination result is confirmable for the image that has a less fluctuation amount and can be obviously determined to be the non-defective product image without performing the deep learning processing, a high processing speed is maintained.

Meanwhile, when NO is determined in step SB3, the processing proceeds to step SB4. The determination of NO in step SB3 indicates that the non-defective product determination is not confirmable, and it is not clear whether the image is the defective product image or the non-defective product image. In this case, in step SB4, the inspection through the deep learning processing having a higher discrimination ability than that of the normal inspection processing is executed. Since the image on which the deep learning processing is executed does not include the image that is obviously determined to be the non-defective product image, a high throughput can be maintained.

Thereafter, in step SB5, it is determined whether or not the possibility of the non-defective product obtained by the deep learning processing exceeds the deep learning processing threshold. When YES is determined in step SB5, it is determined that the image is the non-defective product image by the deep learning processing with high discrimination ability. The processing proceeds to step SB7, and the determination that the image is the non-defective product image is confirmed. Meanwhile, when NO is determined in step SB5, since the image is the defective product image, the determination that the image is the defective product image is confirmed in step SB6.

When it is considered that the majority of the workpiece is generally the non-defective product (for example, 99% or more), it is previously determined that the product is obviously the non-defective product by existing processing in which high-speed processing is executable, and the deep learning processing is applied to only the products for which it is difficult to determine. Accordingly, it is possible to maintain the overall throughput at a high speed while using the deep learning processing having a high discrimination ability.

Figure 11:
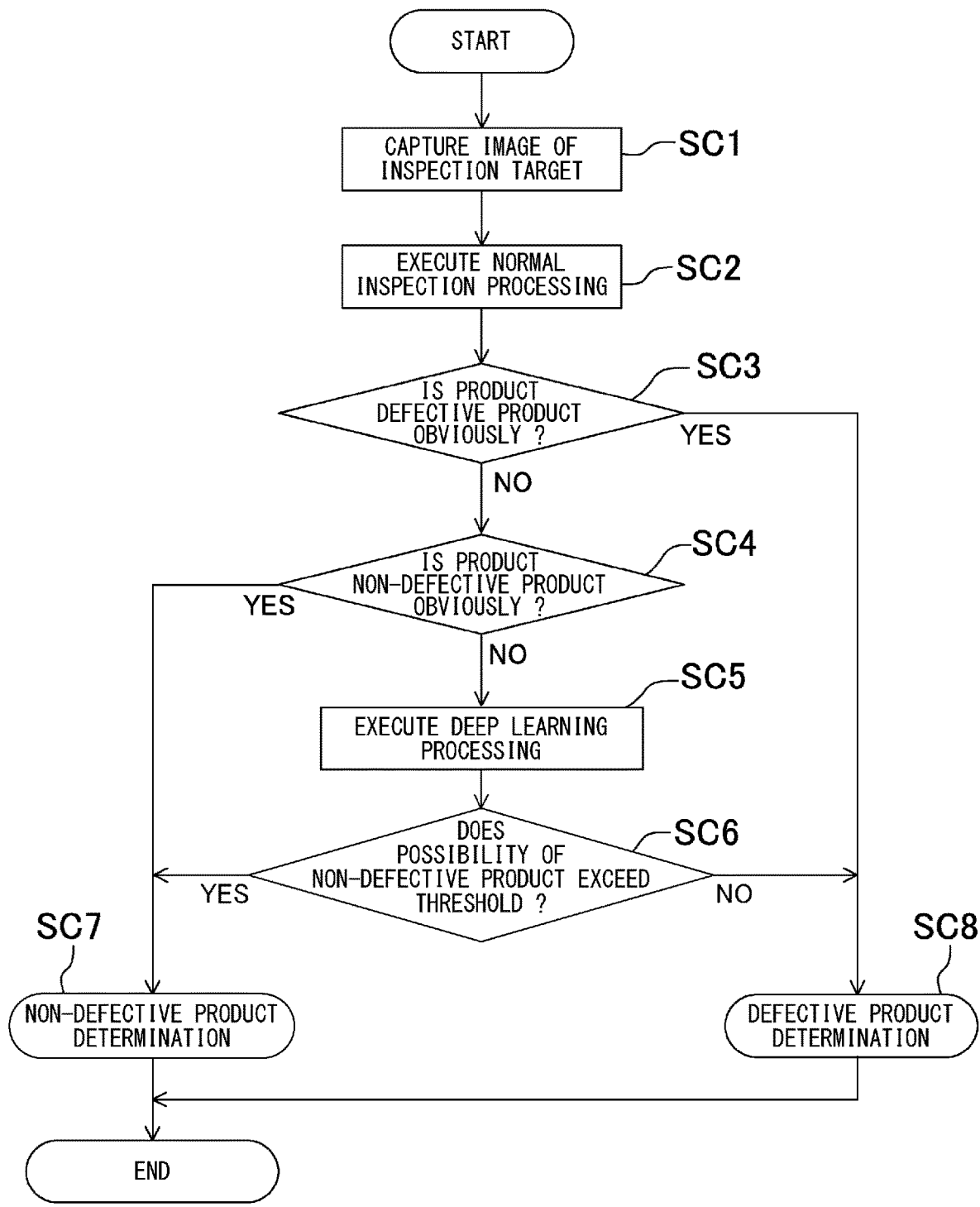
FIG. 11 is a flowchart illustrating a procedure when the non-defective product determination and the defective product determination are confirmed by the normal inspection processing and the quality determination is performed on the remaining product by the deep learning processing.
Figure 13:
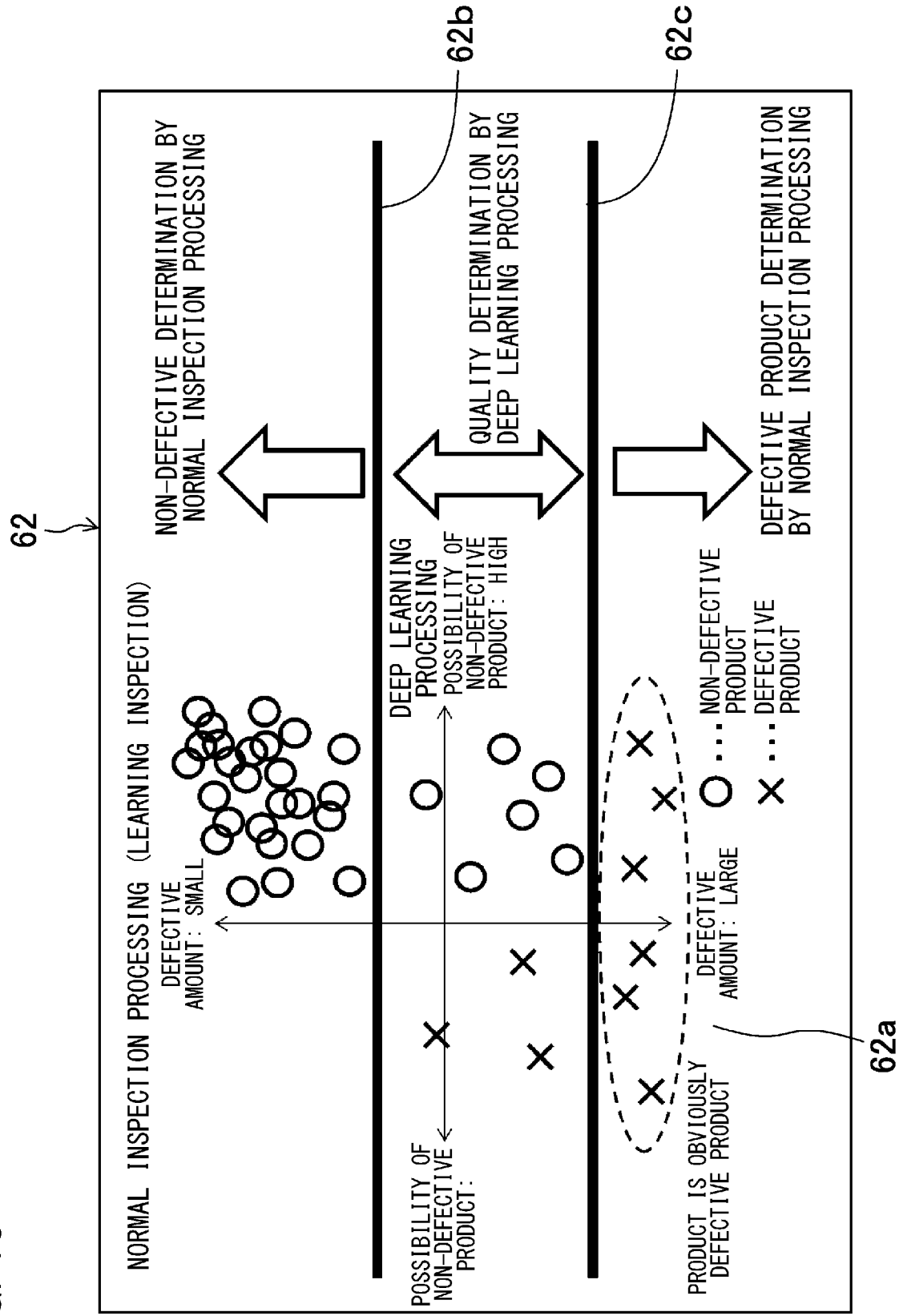
FIG. 13 is a diagram corresponding to FIG. 6 illustrating a case where the non-defective product image and the defective product image are a second distribution example.
Figure 14:
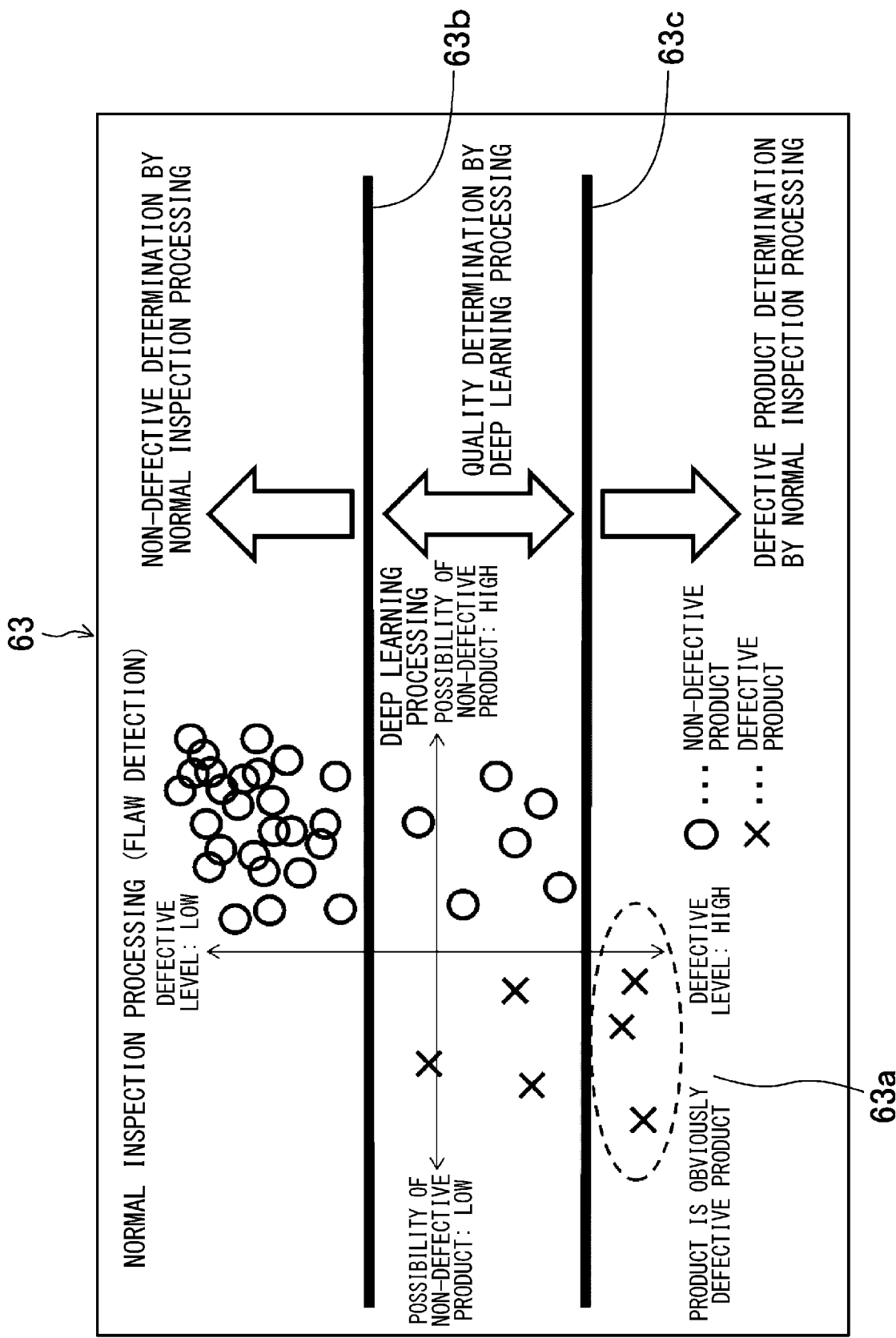
FIG. 14 is a diagram corresponding to FIG. 7 illustrating a case where the non-defective product and the defective product image are the first distribution example.
Figure 15:
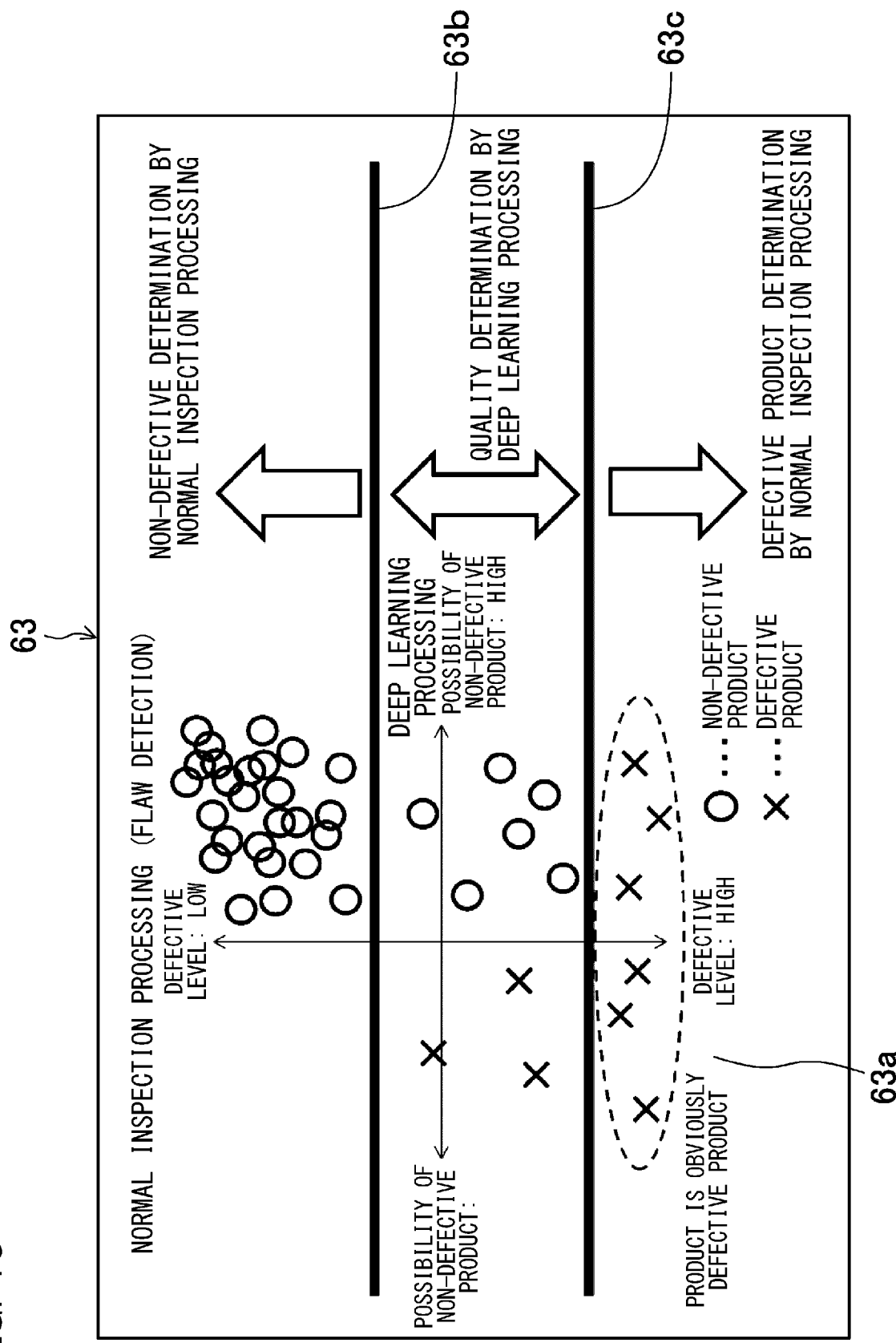
FIG. 15 is a diagram corresponding to FIG. 7 illustrating a case where the non-defective product image and the defective product image are the second distribution example.

3. Case where non-defective product determination and defective product determination are confirmed by normal inspection processing and quality determination is performed on remaining product by deep learning processing FIG. 11 is a flowchart illustrating a procedure when the non-defective product determination and the defective product determination are confirmed by the normal inspection processing and the quality determination is performed on the remaining product by the deep learning processing. This procedure can be applied when the non-defective product image and the defective product image have a distribution such as a first distribution example illustrated in FIGS. 12 and 14 and a distribution such as a second distribution example illustrated in FIGS. 13 and 15.

After the start of the flowchart illustrated in FIG. 11, steps SC1 and SC2 are identical to steps SA1 and SA2 of the flowchart illustrated in FIG. 8. Step SC3 of the flowchart illustrated in FIG. 11 is identical to step SA3 of the flowchart illustrated in FIG. 8, and step SC8 of the flowchart illustrated in FIG. 11 is identical to step SA7 of the flowchart illustrated in FIG. 8.

Figure 12:
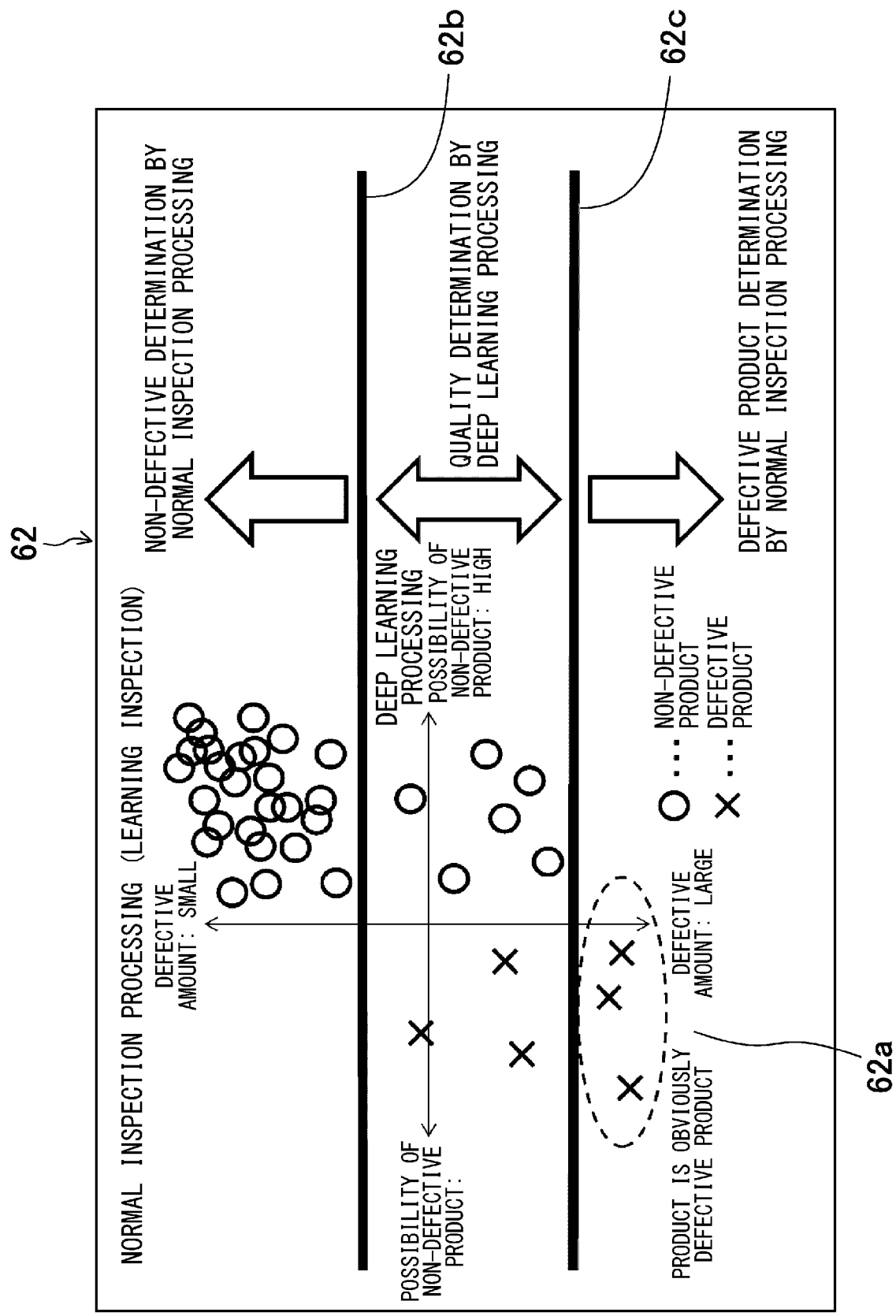
FIG. 12 is a diagram corresponding to FIG. 6 illustrating a case where a non-defective product image and a defective product image are a first distribution example.

In step SC3, for example, in the case of the learning inspection illustrated in FIG. 12, the defect amount corresponding to the normal inspection threshold (indicated by the normal inspection threshold display line 62c) is compared with the defect amount obtained in step SC2. When the defect amount obtained in step SC2 is larger than the normal inspection threshold and the difference is larger than the predetermined value, it is determined that the image is obviously the defective product image. In the case of the distribution state illustrated in FIG. 13, the determination is similarly executable, and in the case of the flaw detection illustrated in FIGS. 14 and 15, the determination is similarly executable.

The normal inspection threshold used in step SC3 is a threshold for confirming the defective product determination. Accordingly, in step SC3, the defective product determination is confirmed for the inspection target image having the characteristic amount with which the defective product determination is executable, while the defective product determination is not confirmed for the inspection target image for which the defective product determination is not confirmable. Thereafter, the processing proceeds to the next step.

When NO is determined in step SC3, the image is the non-defective product image or the image that cannot be obviously determined to be the defective product image. In this case, the processing proceeds to step SC4. In step SC4, it is determined whether or not the image is obviously the non-defective product image as a result of the inspection through the normal inspection processing performed in step SC2.

In step SC4, for example, in the case of the learning inspection, the defect amount corresponding to the normal inspection threshold (the normal inspection threshold display line 62b illustrated in FIG. 12) is compared with the defect amount obtained in step SC2. When the defect amount obtained in step SC2 is larger than the normal inspection threshold and the difference is equal to or larger than the predetermined value, it is determined that the image is obviously the non-defective product image. In the case of the distribution state illustrated in FIG. 13, the determination is similarly executable, and in the case of the flaw detection illustrated in FIGS. 14 and 15, the determination is similarly executable.

The normal inspection threshold used in step SC4 is a threshold for confirming the non-defective product determination. Therefore, in step SC4, the non-defective product determination is confirmed for the inspection target image having the characteristic amount with which the non-defective product determination is executable, while the non-defective product determination is not confirmed for the inspection target image for which the non-defective product determination is not confirmable. Thereafter, the processing proceeds to the next step.

When YES is determined in step SC4, the processing proceeds to step SC7. The determination of YES in step SC4 indicates that the image is obviously the non-defective product image. In this case, the determination that the image is the non-defective product image is confirmed in step SC7. That is, since the determination result is confirmable for the image that has a less fluctuation amount and can be obviously determined to be the non-defective product image without performing the deep learning processing, a high processing speed is maintained.

Meanwhile, when NO is determined in step SC4, the processing proceeds to step SC5. The determination of No in step SC4 indicates that the image that cannot be obviously determined to be the non-defective product image or the image that cannot be obviously determined to be the defective product image. In this case, the inspection through the deep learning processing having a high discrimination ability than that of the normal inspection processing is executed in step SC5.

Thereafter, in step SC6, it is determined whether or not the possibility of the non-defective product obtained by the deep learning processing exceeds the deep learning processing threshold. When YES is determined in step SC6, it is determined that the image is the non-defective product image by the deep learning processing having a high discrimination ability. The processing proceeds to step SC7, and the determination that the image is the non-defective product image is confirmed. Meanwhile, when NO is determined in step SC6, since the image is the defective product image, the determination that the image is the defective product image is confirmed in step SC8. Through such a procedure, it is previously determined that the product is obviously the non-defective product by existing processing in which high-speed processing is executable, and the deep learning processing is applied to only the products for which it is difficult to determine. Accordingly, it is possible to maintain the overall throughput at a high speed while using the deep learning processing having a high discrimination ability. The effect illustrated in FIG. 9 can be simultaneously obtained.

(Configuration of Inspection Selection Unit 27)

Although the inspection selection unit 27 is configured to automatically select only the normal inspection processing and the combination of the normal inspection processing and the deep learning processing by the determination based on a certain threshold as illustrated in the aforementioned flowchart, the present invention is not limited thereto. For example, the user may select any processing from only the normal inspection processing, only the deep learning processing, and the combination of the normal inspection processing and the deep learning processing. For example, an inspection processing selecting user interface may be displayed on the display device 4, and a selection operation of arbitrary inspection processing by the user may be received.

When the inspection processing is selected, the user interfaces 60 to 63 illustrated in FIGS. 4 to 7 are displayed on the display device 4, and thus, the inspection processing that is effective in performing the classification can be selected while the correct answer rate of the normal inspection processing with the correct answer rate of the deep learning processing are compared.

(Example of User Interface)

Figure 16:
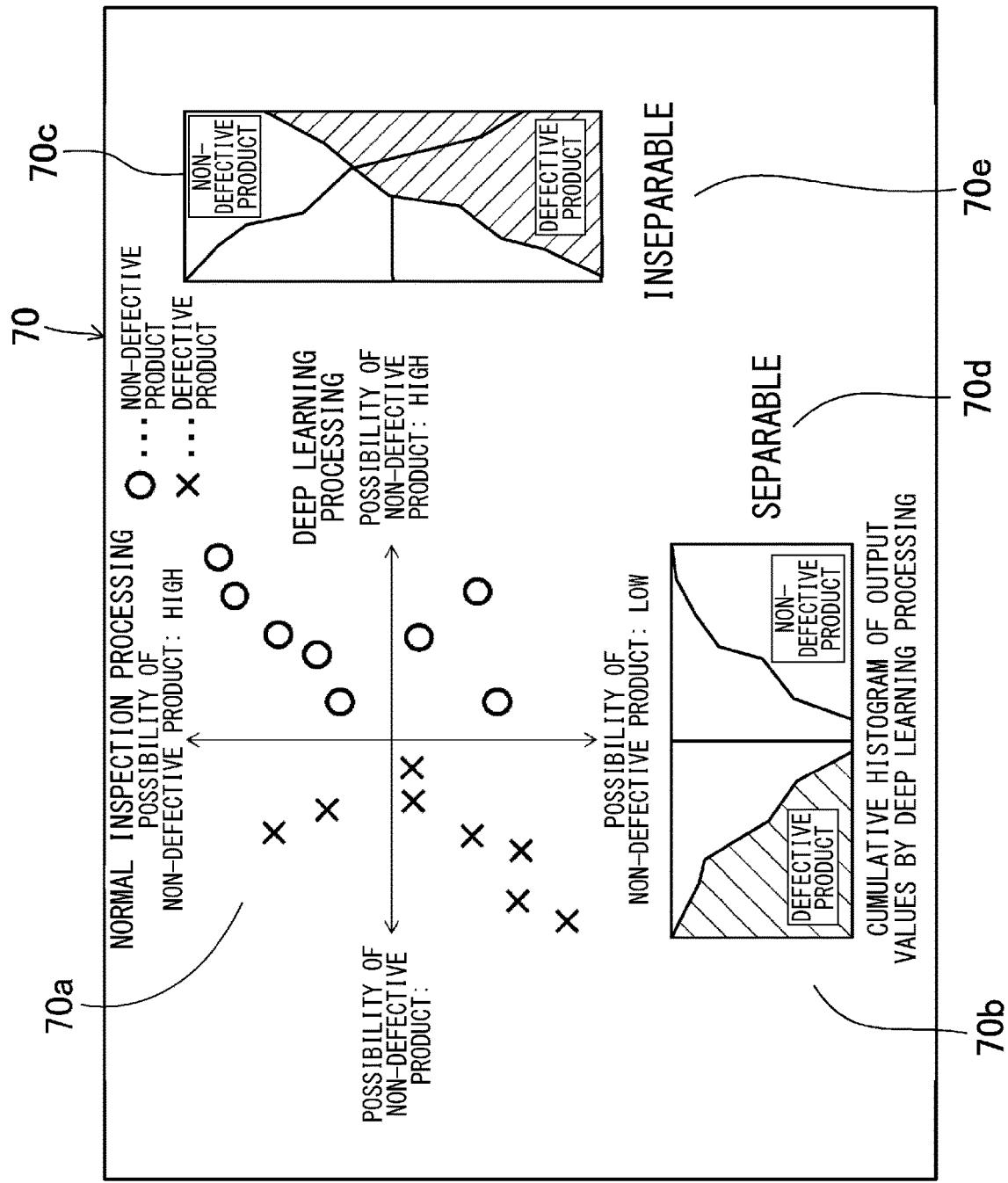
FIG. 16 is a diagram illustrating a user interface when the cumulative histogram is displayed.

The user interface is not limited to the aforementioned user interfaces, and other user interfaces may be used. A graph display region 70a similar to the graph display region 60a of the first user interface 60, a first histogram display region 70b for displaying a cumulative histogram of output values by the deep learning processing, and a second histogram display region 70c for displaying a cumulative histogram of output values by the normal inspection processing are provided on a user interface 70 illustrated in FIG. 16. The first histogram display region 70b and the second histogram display region 70c are provided, and thus, it is possible to compare which processing can be used to separate the non-defective product image and the defective product image. Thus, it is possible to select the image having a favorable separation degree.

A first separation state display region 70d is provided near the first histogram display region 70b, and a second separation state display region 70e is provided near the second histogram display region 70c. In the first separation state display region 70d, a separation state of the non-defective product image and the defective product image of the cumulative histogram displayed in the first histogram display region 70b, that is, whether or not the non-defective product image and the defective product image can be separated is displayed. Similarly, in the second separation state display region 70e, a separation state of the non-defective product image and the defective product image of the cumulative histogram displayed in the second histogram display region 70c is displayed. In the example illustrated in FIG. 16, it can be seen that the non-defective product image and the defective product image cannot be separated by the normal inspection processing but the non-defective product image and the defective product image can be separated by the deep learning processing.

When the obviously defective product is confirmed to be the defective product by the normal inspection processing and the remaining product is inspected by the deep learning processing, the cumulative histogram of the output values by the deep learning processing is updated according to the threshold for confirming that the product is obviously the defective product by the normal inspection processing, and thus, it is possible to adjust the threshold for separating the non-defective product image from the defective product image.

Figure 17:
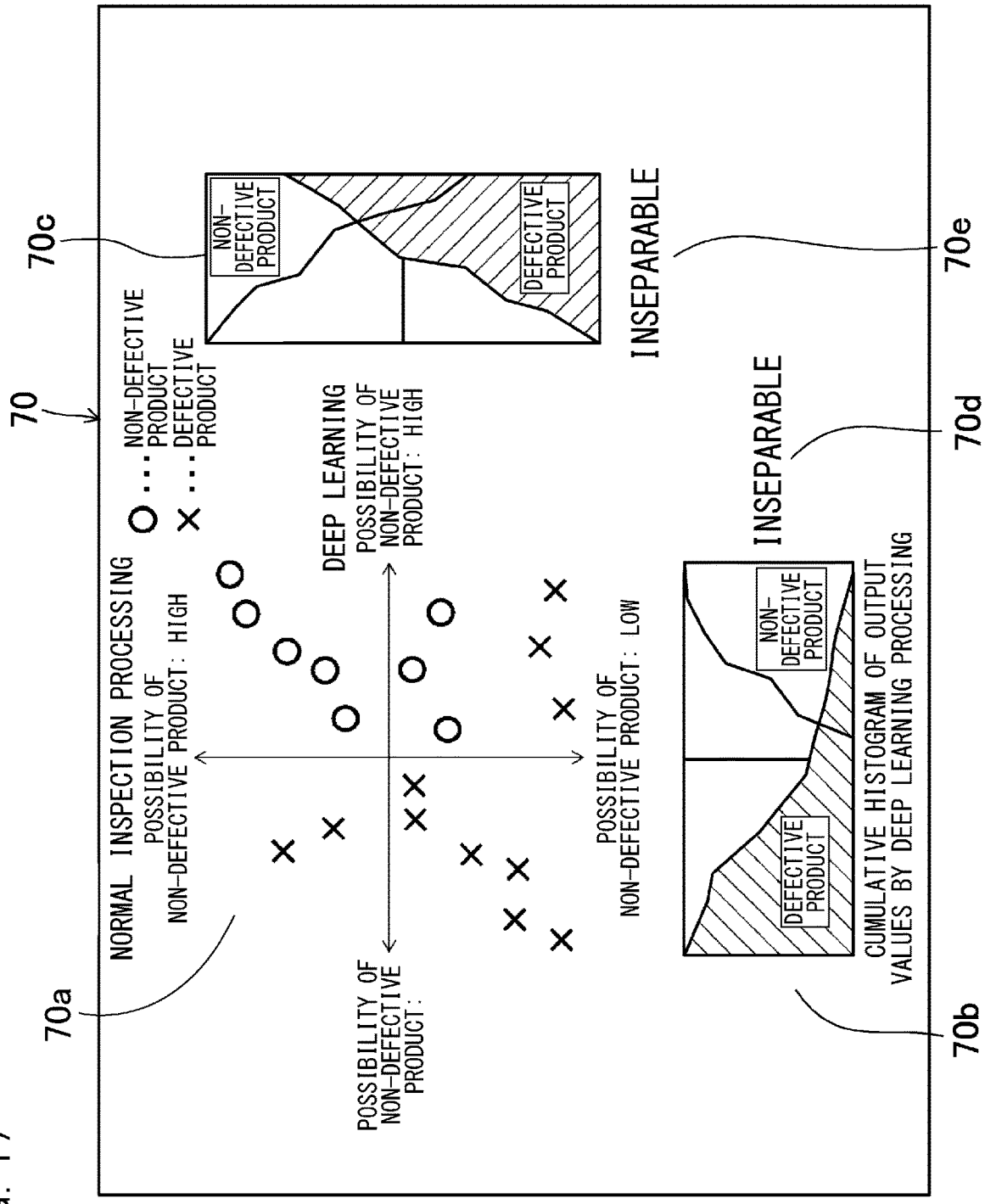
FIG. 17 is a diagram corresponding to FIG. 16 illustrating a distribution example when the non-defective product image and the defective product image cannot be separated by both the normal inspection processing and the deep learning processing.

For example, in the distribution example illustrated in FIG. 17, when the cumulative histograms displayed in the first histogram display region 70b and the second histogram display region 70c are viewed, it can be seen that the non-defective product image and the defective product image cannot be separated by both the normal inspection processing and the deep learning processing.

Figure 18:
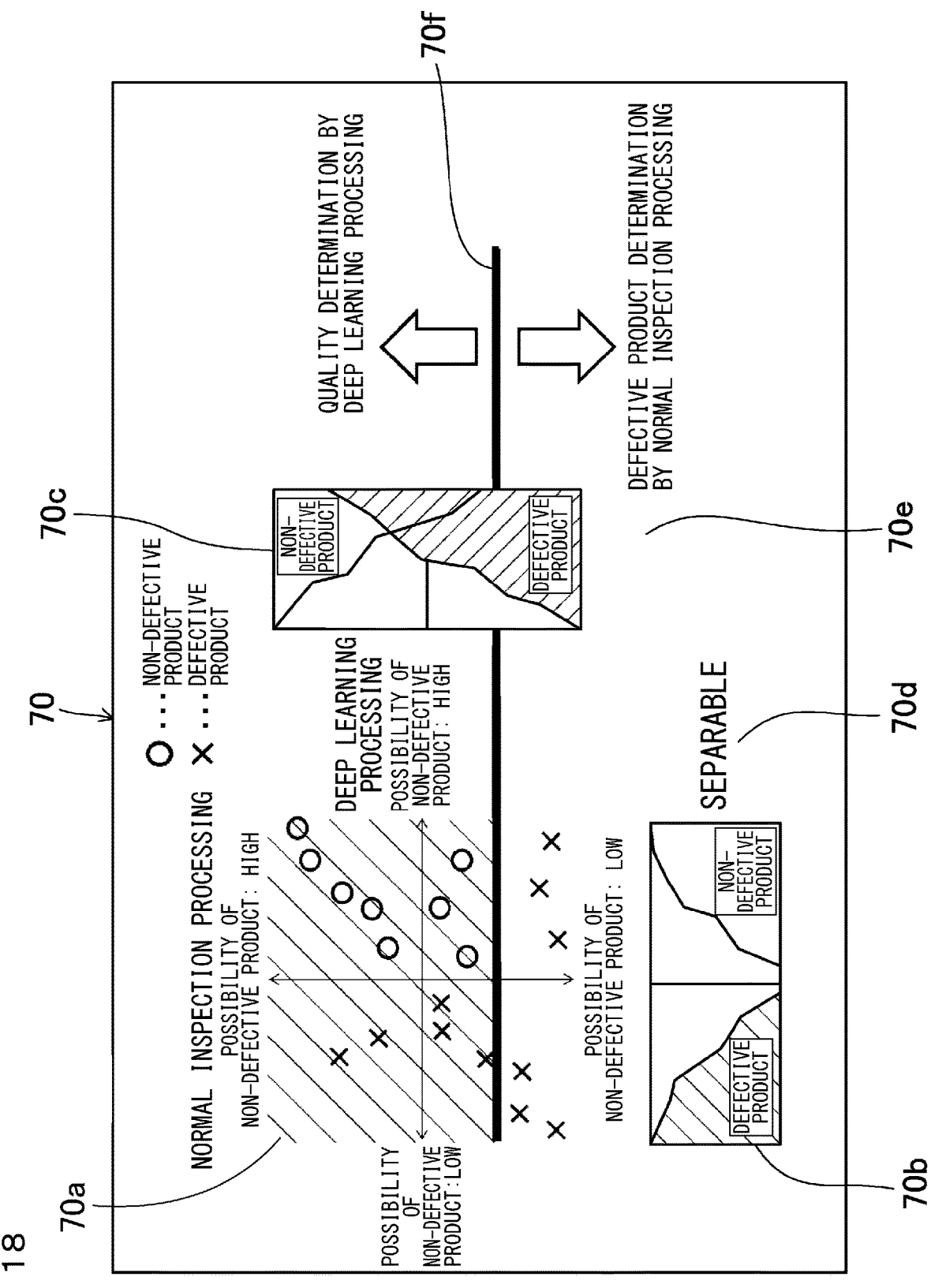
FIG. 18 is a diagram corresponding to FIG. 16 when a normal inspection threshold display line is displayed.

In such a case, as illustrated in FIG. 18, the non-defective product image and the defective product image can be separated by both the normal inspection processing and the deep learning processing by displaying a normal inspection threshold display line 70f for displaying the threshold of the normal inspection processing on the user interface 70 and moving the normal inspection threshold display line 70f in the vertical direction by using the keyboard 51 or the mouse 52. When the normal inspection threshold display line 70f is moved in the vertical direction, a range indicated by oblique lines in FIG. 18, that is, a range to be inspected by the deep learning processing can be changed. The range to be inspected by the deep learning processing is changed, and thus, the cumulative histogram displayed in the second histogram display region 70c is updated. The user can adjust the normal inspection threshold while viewing the cumulative histogram displayed in the second histogram display region 70c, and can set the threshold with which the non-defective product image and the defective product image is separable.

Figure 19:
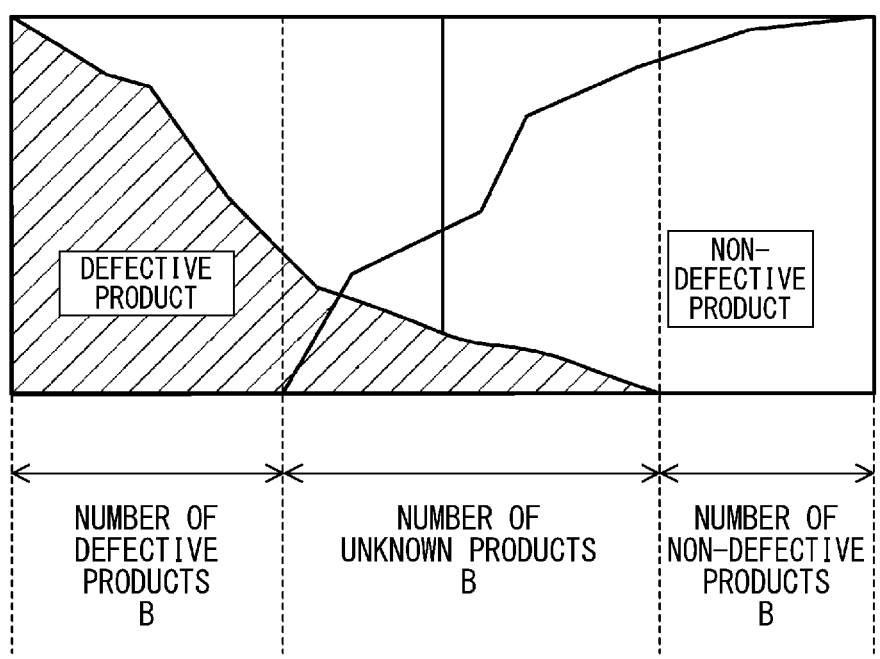
FIG. 19 is a diagram illustrating a distribution of only defective products, a distribution of only non-defective products, and a distribution in which the defective products and the non-defective products are mixed in the cumulative histogram.

In the case of a cumulative histogram illustrated in FIG. 19, the number of images belonging to a distribution range B of only the defective products can be referred as the "number of defective products", the number of images belonging to a distribution range C of only the non-defective products can be referred as the "number of non-defective products", and the number of images belonging to a distribution range D in which the defective products and the non-defective products are mixed can be referred to as the "number of unknown products". The numerical values of these ranges B to D are displayed on the display device 4, and thus, the numerical values of the ranges B to D can be compared. Accordingly, the range having a favorable separation degree can be selected.

Figure 20:
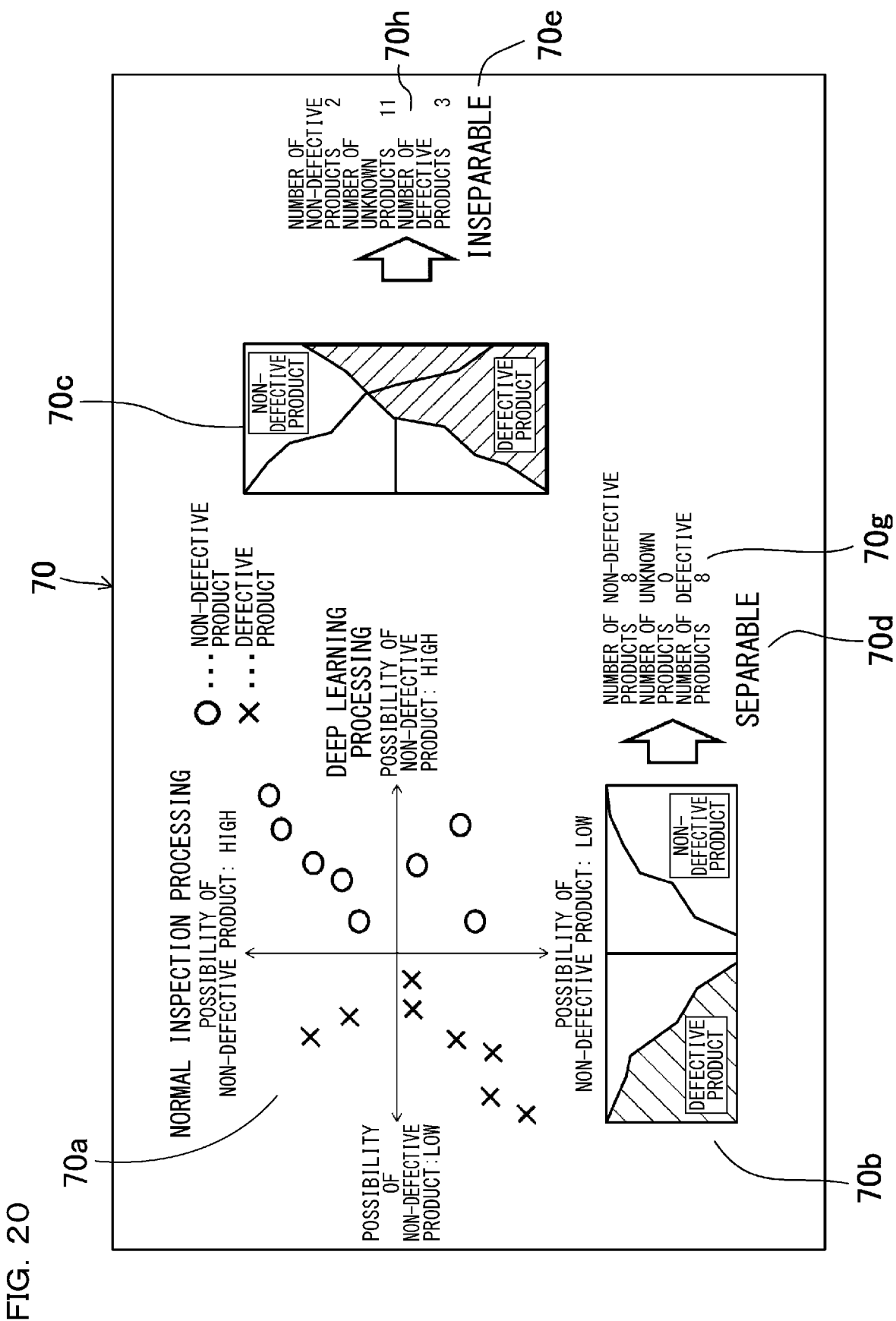
FIG. 20 is a diagram corresponding to FIG. 16 illustrating an example in which numerical values are displayed.

For example, in the example illustrated in FIG. 20, a first numerical value display region 70*g* and a second numerical value display region 70*h* are provided on the user interface 70. In the first numerical value display region 70*g*, the number of defective products, the number of non-defective products, and the number of unknown products calculated based on the output value by the deep learning processing are displayed.

In the second numerical value display region 70*h*, the number of defective products, the number of non-defective products, and the number of unknown products calculated based on the output value by the normal inspection processing are displayed. As illustrated in this diagram, when the numerical values displayed in the first numerical value display region 70*g* and the second numerical value display region 70*h* are viewed, it is possible to grasp whether or not the non-defective product image and the defective product image can be separated by the normal inspection processing and the deep learning processing.

When the obviously defective product is confirmed as the defective product by the normal inspection processing and the remaining product is inspected by the deep learning processing, the "display of numerical value of separation degree" is updated according to the threshold for confirming the obviously defective product by the normal inspection processing, and thus, the threshold for separating the non-defective product image and the defective product image can be adjusted.

Figure 21:
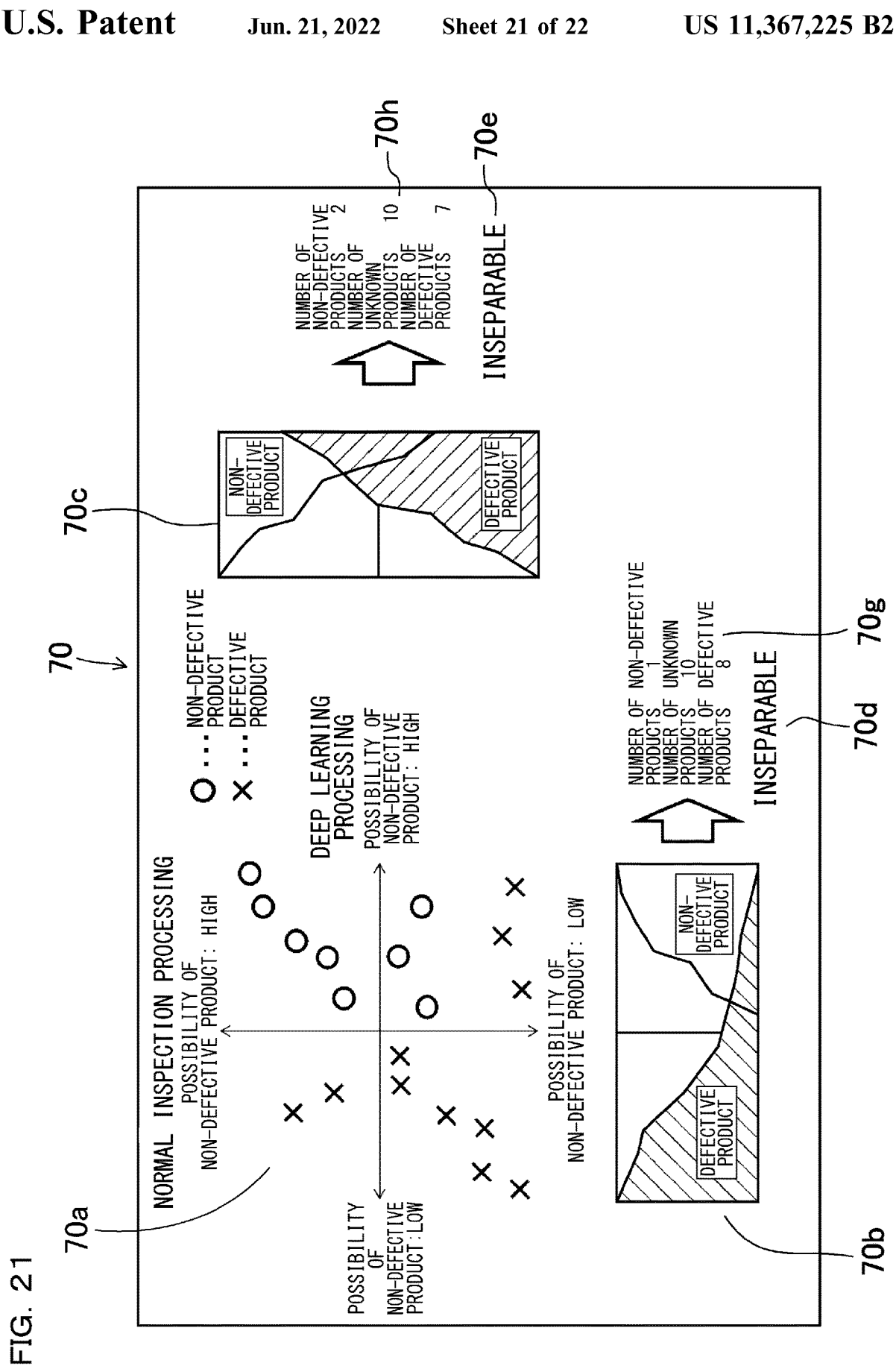
FIG. 21 is a diagram corresponding to FIG. 20 illustrating a distribution example when the non-defective product image and the defective product image cannot be separated by both the normal inspection processing and the deep learning processing.

For example, in the distribution example illustrated in FIG. 21, the non-defective product image and the defective product image cannot be separated by both the normal inspection processing and the deep learning processing.

Figure 22:
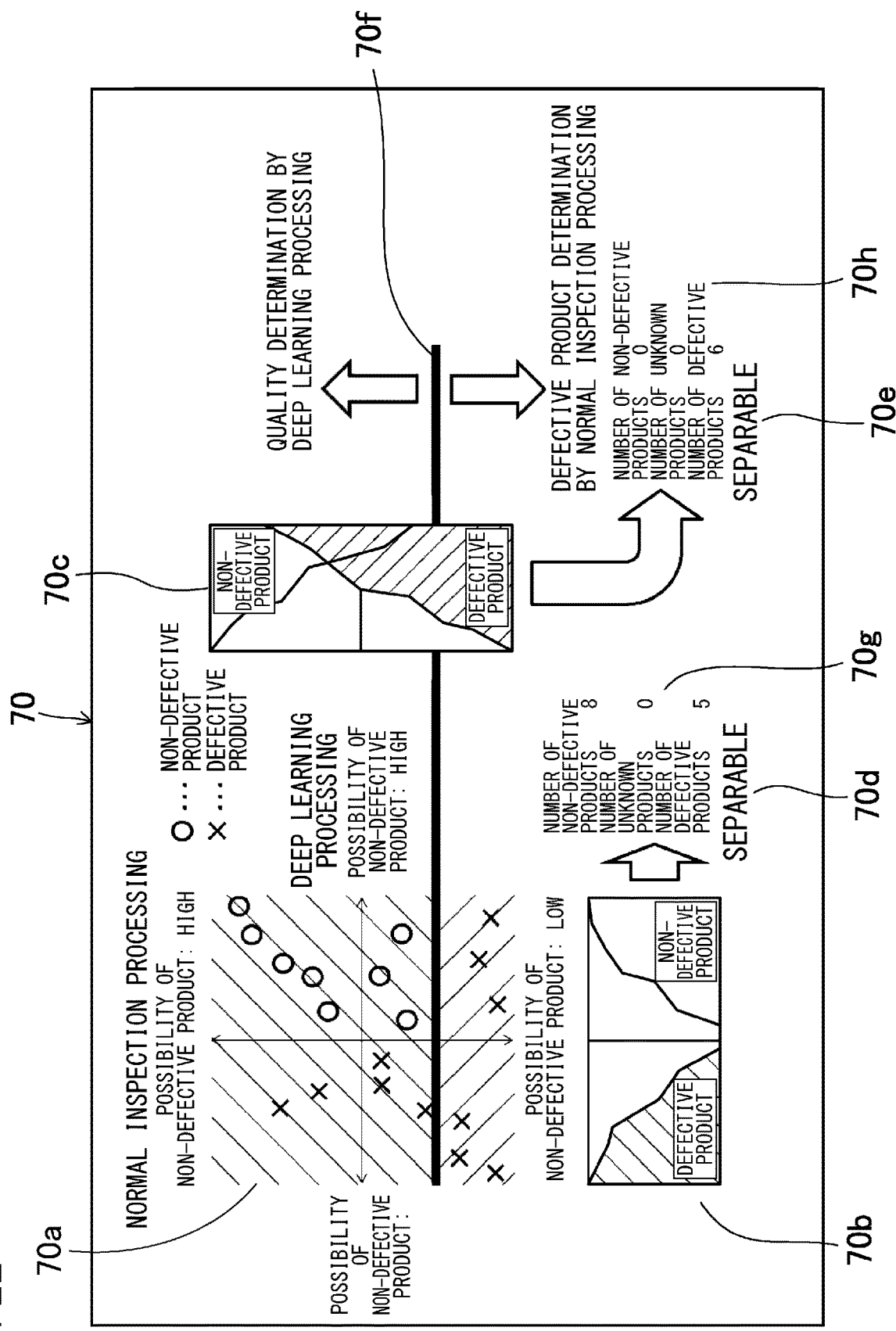
FIG. 22 is a diagram corresponding to FIG. 20 illustrating a normal inspection threshold display line.

In such a case, as illustrated in FIG. 22, the non-defective product image and the defective product image can be separated by both the normal inspection processing and the deep learning processing by displaying a normal inspection threshold display line 70*f* for displaying the threshold of the normal inspection processing on the user interface 70 and moving the normal inspection threshold display line 70*f* in the vertical direction by using the keyboard 51 or the mouse 52. When the normal inspection threshold display line 70*f* is moved in the vertical direction, the display of the numerical value of the separation degree by the deep learning processing for a range indicated by diagonally left downward lines in FIG. 22, that is, a range to be inspected by the deep learning processing is updated. Further, the display of the numerical value of the separation degree by the normal inspection processing for a range indicated by diagonally right downward lines in this diagram, that is, a range to be inspected by the normal inspection processing is updated. The user can adjust the normal inspection threshold while viewing the numerical values displayed in the first numerical value display region 70*g* and the second numerical value display region 70*h*, and can set the threshold with which the non-defective product image and the defective product image is separable.

Advantageous Effects of Embodiment

As described above, in accordance with the image inspection apparatus 1 according to this embodiment, the normal inspection processing and the deep learning processing can be set in the setting mode, the correct answer rate when the normal inspection processing is applied to the newly acquired non-defective product images and defective product images and the correct answer rate when the deep learning processing is applied to the newly acquired non-defective product images and defective product images can be calculated, and the calculated correct answer rates can be displayed on the display device 4. Since the correct answer rate when the normal inspection processing is applied and the correct answer rate when the deep learning processing is applied are displayed in the comparable form on the display device 4, the user can easily discriminate which processing of the normal inspection processing and the deep learning processing is suitable for the inspection of the inspection target based on the display contents of the display device 4. It is also possible to easily discriminate whether or not the processing in which the normal inspection processing and the deep learning processing are combined is suitable for the inspection of the inspection target.

Based on the comparison result of the correct answer rates, it is possible to select any one of the normal inspection processing and the deep learning processing or the inspection processing as the combination thereof. For example, when a sufficiently stable inspection is executable only by the normal inspection processing, the unstable behavior peculiar to the deep learning processing is eliminated and a processing time is reduced by selecting the normal inspection processing. Meanwhile, in the case of the inspection target that cannot be easily handled only by the normal inspection processing, the inspection accuracy is improved by selecting the deep learning processing.

Since the user can adjust the normal inspection threshold while viewing the determination result of the normal inspection processing displayed on the display device 4, the non-defective product and the defective product can be appropriately separated.

Since the separation degree of the non-defective product and the defective product can be checked by using the cumulative histograms or the numerical values, the separation state of the non-defective product and the defective product can be easily grasped.

After the setting mode, when the normal inspection processing is applied to the newly acquired inspection target image, it is possible to confirm the non-defective product determination for the inspection target image having the characteristic amount with which the non-defective product determination is executable based on the characteristic amount within the inspection target image and the threshold for confirming the non-defective product determination. It is possible to confirm the defective product determination for the inspection target image having the characteristic amount with which the defective product determination is executable based on the characteristic amount within the inspection target image and the threshold for confirming the defective product determination.

Therefore, a throughput is greatly improved by inspecting the inspection target that can be obviously determined to be the non-defective product or the inspection target that can be obviously determined to be the defective product by the normal inspection processing with a high processing speed. Since only a few remaining inspection targets are inspected by the deep learning processing, it is possible to increase the inspection accuracy while suppressing a reduction in processing speed.

The aforementioned embodiment is merely an example in all respects, and should not be interpreted in a limited manner. All modifications and changes belonging to the equivalent scope of the claims are within the scope of the present invention.

As described above, the image inspection apparatus according to the present invention can be used when the quality determination of an inspection target is performed based on an inspection target image obtained by imaging the inspection target.

What is claimed is:

1. An image inspection apparatus that performs a quality determination of an inspection target based on an inspection target image acquired by capturing the inspection target, the apparatus comprising:
   a normal inspection setting section that performs a setting of normal inspection processing by receiving a setting of a characteristic amount used for an inspection and a setting of a threshold for confirming a non-defective product determination or a threshold for confirming a defective product determination from a user, the threshold being compared with the characteristic amount;
   a deep learning setting section that causes a neural network to learn by inputting a plurality of non-defective product images to which non-defective product attributes are given and/or a plurality of defective product images to which defective product attributes are given to an input layer of the neural network, and performs a setting of deep learning processing for classifying a newly input inspection target image into the non-defective product image and the defective product image; and
   an inspection execution section that applies the normal inspection processing to a newly acquired inspection target image, confirms the non-defective product determination or the defective product determination for the newly acquired inspection target image having the characteristic amount with which the non-defective product determination or the defective product determination is executable based on the characteristic amount within the newly acquired inspection target image and the threshold for confirming the non-defective product determination or the threshold for confirming the defective product determination, applies the deep learning processing to the newly acquired inspection target image having the characteristic amount with which the non-defective product determination or the defective product determination is not confirmable, and executes the non-defective product determination or the defective product determination, wherein
   the inspection execution section is configured to perform the quality determination by a difference inspection for detecting a blob of a difference between a registration image registered in advance and the newly acquired inspection target image, and confirm the defective product determination by the normal inspection processing when a blob area of the difference obtained by the normal inspection processing is equal to or larger than the threshold for confirming the defective product determination.

2. The image inspection apparatus according to claim 1, wherein
   the inspection execution section is configured to confirm the non-defective product determination for the newly acquired inspection target image having the characteristic amount with which the non-defective product determination is executable and confirm the defective product determination for the newly acquired inspection target image having the characteristic amount with which the defective product determination is executable, by the normal inspection processing, and apply the deep learning processing to only the newly acquired inspection target image having the characteristic amount with which the non-defective product determination is not confirmable and the newly acquired inspection target image having the characteristic amount with which the defective product determination is not confirmable.

3. An image inspection apparatus that performs a quality determination of an inspection target based on an inspection target image acquired by capturing the inspection target, the apparatus comprising:
   a normal inspection setting section that performs a setting of normal inspection processing by receiving a setting of a characteristic amount used for an inspection and a setting of a threshold for confirming a non-defective product determination or a threshold for confirming a defective product determination from a user, the threshold being compared with the characteristic amount;
   a deep learning setting section that causes a neural network to learn by inputting a plurality of non-defective product images to which non-defective product attributes are given and/or a plurality of defective product images to which defective product attributes are given to an input layer of the neural network, and performs a setting of deep learning processing for classifying a newly input inspection target image into the non-defective product image and the defective product image; and
   an inspection execution section that applies the normal inspection processing to a newly acquired inspection target image, confirms the non-defective product determination or the defective product determination for the newly acquired inspection target image having the characteristic amount with which the non-defective product determination or the defective product determination is executable based on the characteristic amount within the newly acquired inspection target image and the threshold for confirming the non-defective product determination or the threshold for confirming the defective product determination, applies the deep learning processing to the newly acquired inspection target image having the characteristic amount with which the non-defective product determination or the defective product determination is not confirmable, and executes the non-defective product determination or the defective product determination, wherein
   the inspection execution section is configured to perform the quality determination by a difference inspection for detecting a blob of a difference between a registration image registered in advance and the newly acquired inspection target image, and confirm the non-defective product determination by the normal inspection processing when a blob area of the difference obtained by the normal inspection processing is equal to or smaller than the threshold for confirming the non-defective product determination.

4. The image inspection apparatus according to claim 3, wherein the inspection execution section is configured to confirm the non-defective product determination for the newly acquired inspection target image having the characteristic amount with which the non-defective product determination is executable and confirm the defective product determination for the newly acquired inspection target image having the characteristic amount with which the defective product determination is executable, by the normal inspection processing, and apply the deep learning processing to only the newly acquired inspection target image having the characteristic amount with which the non-defective product determination is not confirmable and the newly acquired inspection target image having the characteristic amount with which the defective product determination is not confirmable.

\* \* \* \* \*